United States Patent
Trani

(10) Patent No.: US 10,158,550 B2
(45) Date of Patent: Dec. 18, 2018

(54) ACCESS CONTROL SYSTEM WITH OMNI AND DIRECTIONAL ANTENNAS

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 58 days.

(21) Appl. No.: 15/160,722

(22) Filed: May 20, 2016

(65) Prior Publication Data

US 2016/0284147 A1 Sep. 29, 2016

Related U.S. Application Data

(63) Continuation-in-part of application No. 14/605,165, filed on Jan. 26, 2015, now Pat. No. 9,697,656.

(Continued)

(51) Int. Cl.
*G05B 19/16* (2006.01)
*H04L 12/26* (2006.01)
(Continued)

(52) U.S. Cl.
CPC .............. *H04L 43/16* (2013.01); *G01S 5/00* (2013.01); *G01S 5/02* (2013.01); *G01S 5/0205* (2013.01);
(Continued)

(58) Field of Classification Search
CPC .......... G05B 2219/2642; H04W 4/008; H04W 12/06; H04W 12/08; H04W 88/02;
(Continued)

(56) References Cited

U.S. PATENT DOCUMENTS

| 7,035,650 B1 | 4/2006 | Moskowitz et al. |
| 8,009,013 B1 | 8/2011 | Hirschfeld et al. |

(Continued)

FOREIGN PATENT DOCUMENTS

| EP | 1981183 A2 | 10/2008 |
| GB | 2468731 A | 9/2010 |

(Continued)

OTHER PUBLICATIONS

"Apriva Reader." Apriva. Retrieved from http://www.apriva.com/iss/solutions/apriva-reader. 2 pages. Dec. 2014.

(Continued)

*Primary Examiner* — Tesfaldet Bocure
(74) *Attorney, Agent, or Firm* — HoustonHogle LLP

(57) ABSTRACT

An access control system and method for monitoring an access point are disclosed. Preferably, a positioning unit of the system includes a primary antenna and a directional antenna that determine close proximity of users to the access point while also allowing the system to continuously monitor the locations of the users. The primary antenna preferentially receives wireless signals sent from user devices (e.g. mobile phones, fobs) of the users while the directional antenna receives the wireless signals within a threshold area of the access point. The system authorizes users to enter each access point by matching user information of the users extracted from the wireless signals to locally stored user information for the users, and determining that the matched user information is referenced within locally stored authorization information indicating which users can access the access point. The system can pre-authorize the users as they approach the threshold area.

20 Claims, 13 Drawing Sheets

Related U.S. Application Data

(60) Provisional application No. 62/193,907, filed on Jul. 17, 2015, provisional application No. 62/185,349, filed on Jun. 26, 2015, provisional application No. 62/181,434, filed on Jun. 18, 2015, provisional application No. 62/164,054, filed on May 20, 2015, provisional application No. 62/045,939, filed on Sep. 4, 2014, provisional application No. 62/039,039, filed on Aug. 19, 2014.

(51) Int. Cl.
| | |
|---|---|
| H04W 64/00 | (2009.01) |
| H04W 4/80 | (2018.01) |
| H04B 7/04 | (2017.01) |
| H04W 4/00 | (2018.01) |
| G01S 5/00 | (2006.01) |
| G01S 5/02 | (2010.01) |
| H04W 88/08 | (2009.01) |
| G07C 9/00 | (2006.01) |
| H04W 4/04 | (2009.01) |

(52) U.S. Cl.
CPC ...... *G07C 9/00103* (2013.01); *G07C 9/00111* (2013.01); *G07C 9/00571* (2013.01); *H04B 7/04* (2013.01); *H04W 4/008* (2013.01); *H04W 4/80* (2018.02); *H04W 64/00* (2013.01); *G07C 2009/00769* (2013.01); *G07C 2209/63* (2013.01); *H04W 4/043* (2013.01); *H04W 88/08* (2013.01)

(58) Field of Classification Search
CPC ...... H04W 64/00; H04W 4/023; H04L 67/12; H04L 43/16; G01S 5/00; G01S 5/02; G01S 5/0205; G07C 9/00103; G07C 9/00111; G07C 9/0011; G07C 9/00571; G07C 9/00007; G07C 9/00174; G07C 2009/00769; G07C 2009/00317; G07C 2009/00333; H04B 7/04
USPC .................. 340/5, 5.3, 5.61, 539.14
See application file for complete search history.

(56) References Cited

U.S. PATENT DOCUMENTS

| | | | |
|---|---|---|---|
| 8,430,310 | B1 | 4/2013 | Ho et al. |
| 9,697,656 | B2 | 7/2017 | Trani |
| 2004/0153671 | A1 | 8/2004 | Schuyler et al. |
| 2005/0062649 | A1 | 3/2005 | Chiang et al. |
| 2006/0270458 | A1 | 11/2006 | Watanabe |
| 2006/0279422 | A1 | 12/2006 | Sweatte |
| 2007/0109111 | A1 | 5/2007 | Breed et al. |
| 2008/0164995 | A1* | 7/2008 | Coronel .................. G01D 21/00 340/539.1 |
| 2008/0285802 | A1 | 11/2008 | Bramblet et al. |
| 2009/0219152 | A1* | 9/2009 | Angelo ................ G08B 25/008 340/540 |
| 2010/0094482 | A1 | 4/2010 | Schofield et al. |
| 2010/0194566 | A1 | 8/2010 | Monden |
| 2010/0233975 | A1* | 9/2010 | Wu ....................... H04W 52/52 455/115.1 |
| 2011/0314539 | A1 | 12/2011 | Horton |
| 2011/0316703 | A1 | 12/2011 | Butler et al. |
| 2012/0040650 | A1 | 2/2012 | Rosen |
| 2012/0062422 | A1 | 3/2012 | Wu et al. |
| 2012/0062427 | A1 | 3/2012 | Wu |
| 2012/0154115 | A1 | 6/2012 | Herrala |
| 2012/0202560 | A1 | 8/2012 | Donaldson |
| 2012/0242481 | A1 | 9/2012 | Gernandt et al. |
| 2012/0280783 | A1 | 11/2012 | Gerhardt et al. |
| 2012/0330849 | A1 | 12/2012 | Nielsen et al. |
| 2013/0002399 | A1 | 1/2013 | Frueh |
| 2013/0138314 | A1 | 5/2013 | Viittala et al. |
| 2013/0149991 | A1 | 6/2013 | Hepo-Oja |
| 2013/0176107 | A1 | 7/2013 | Dumas et al. |
| 2013/0214898 | A1 | 8/2013 | Pineau et al. |
| 2013/0237193 | A1 | 9/2013 | Dumas et al. |
| 2013/0237272 | A1 | 9/2013 | Prasad |
| 2014/0015978 | A1 | 1/2014 | Smith |
| 2014/0077929 | A1 | 3/2014 | Dumas et al. |
| 2014/0129006 | A1 | 5/2014 | Chen et al. |
| 2014/0167912 | A1 | 6/2014 | Snyder et al. |
| 2014/0183269 | A1 | 7/2014 | Glaser |
| 2014/0197989 | A1 | 7/2014 | Hepo-Oja |
| 2014/0201537 | A1 | 7/2014 | Sampas |
| 2014/0240088 | A1 | 8/2014 | Robinette et al. |
| 2014/0253326 | A1 | 9/2014 | Cho et al. |
| 2014/0266585 | A1 | 9/2014 | Chao et al. |
| 2015/0071274 | A1 | 3/2015 | Sugar et al. |
| 2015/0348220 | A1 | 12/2015 | Sharma et al. |
| 2016/0055692 | A1 | 2/2016 | Trani |
| 2016/0267760 | A1 | 9/2016 | Trani |
| 2016/0284183 | A1 | 9/2016 | Trani |
| 2016/0343187 | A1 | 11/2016 | Trani |
| 2016/0344091 | A1 | 11/2016 | Trani |
| 2017/0256107 | A1 | 9/2017 | Trani |

FOREIGN PATENT DOCUMENTS

| | | |
|---|---|---|
| WO | 9606409 A1 | 2/1996 |
| WO | 2016028481 A1 | 2/2016 |

OTHER PUBLICATIONS

"EK6 Bluetooth Proximity Reader: EK6 Installation Guide." EC Key. 2 pages. Mar. 2014.
EK6 Bluetooth Proximity Readers. EC Key, 2014. Retrieved from http://eckey.com/enterprise-access. 2 pages.
International Search Report and Written Opinion of the International Searching Authority, dated Oct. 28, 2015 from International Application PCT/US2015/043455, International Filing Date Aug. 3, 2015. Ten pages.
Martin, Zack. "Vodafone piloting emerging access control tech." SecureIDNews, Sep. 26, 2014. Retrieved from http://www.secureidnews. com/news-item/vodafone-piloting-emerging-access-control-tech. 2 pages.
International Search Report and Written Opinion of the International Searching Authority, dated Aug. 8, 2016 from International Application PCT/US2016/033597, International Filing Date May 20, 2016. Eleven pages.
International Search Report and Written Opinion of the International Searching Authority, dated Sep. 5, 2016, from International Application PCT/US2016/033600, filed May 20, 2016. Twelve pages.
Jonietz, Ericka, "Injecting Liquid Metal Into a Polymer Results in a Twistable, Stretchable Antenna," (2009).

* cited by examiner

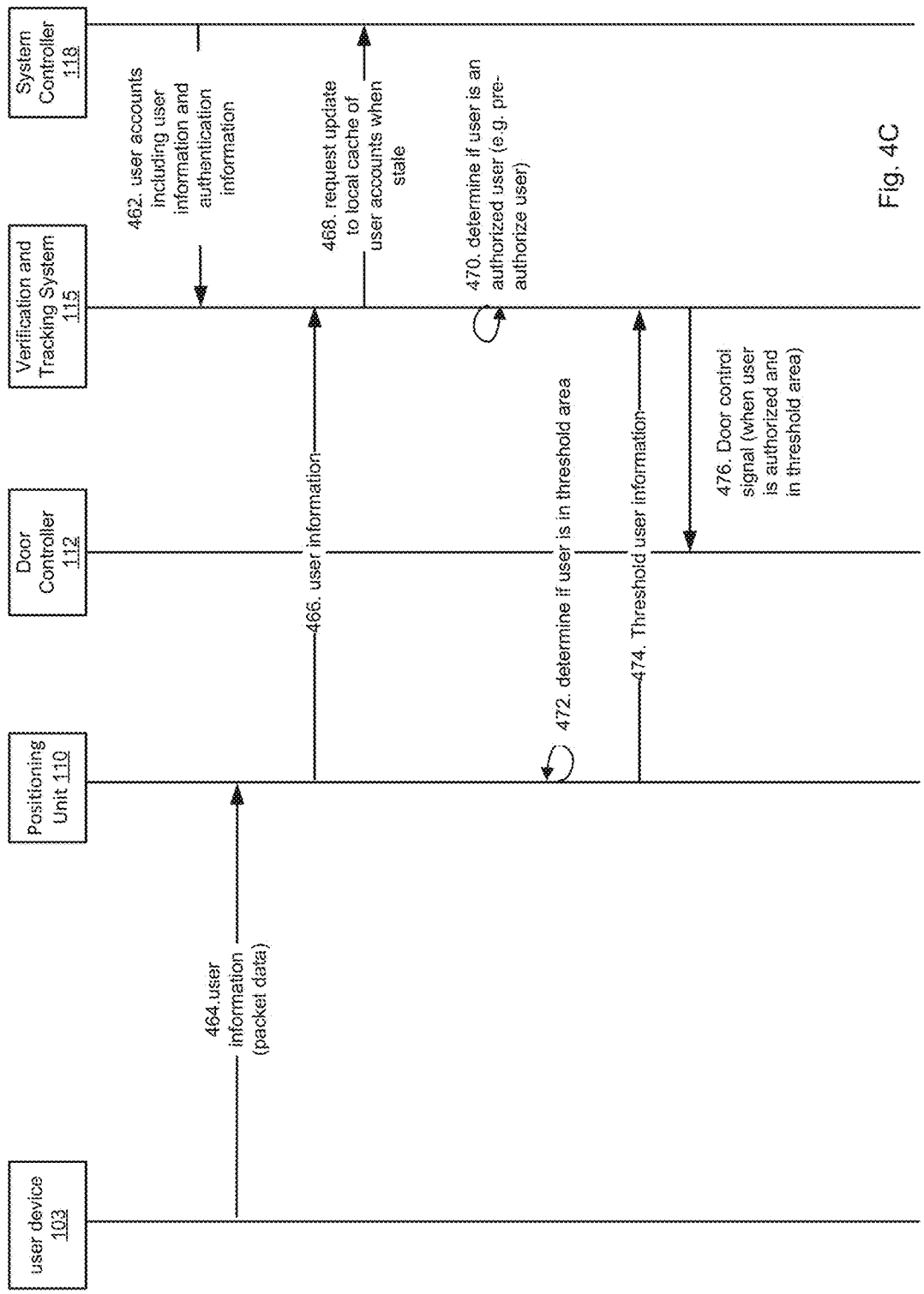

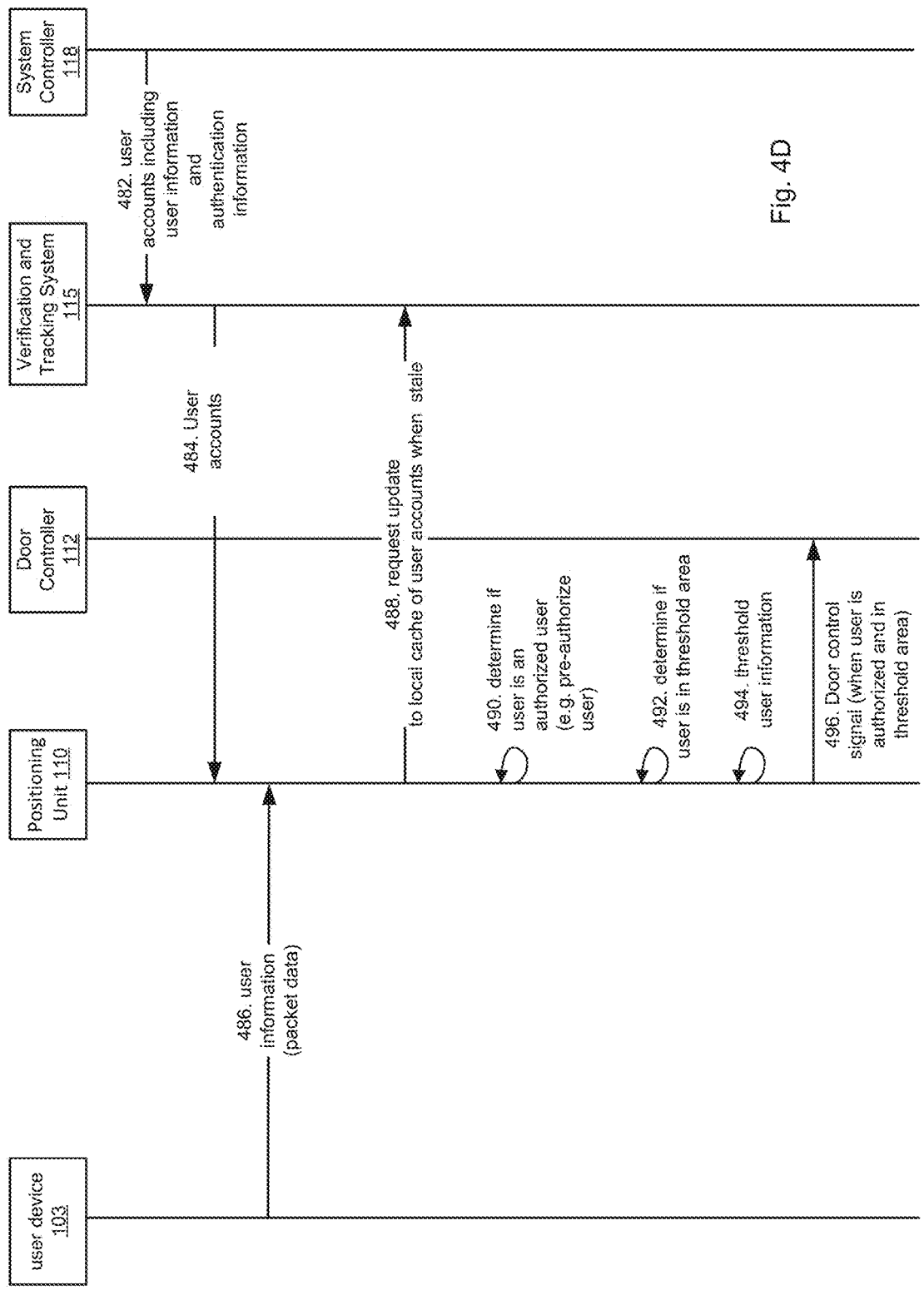

ACCESS CONTROL SYSTEM WITH OMNI AND DIRECTIONAL ANTENNAS

RELATED APPLICATIONS

This application is a continuation-in-part of U.S. application Ser. No. 14/605,165, now U.S. Pat. No. 9,697,656, filed on Jan. 26, 2015, which claims the benefit under 35 USC 119(e) of U.S. Provisional Application No. 62/039,039, filed on Aug. 19, 2014 and 62/045,939, filed on Sep. 4, 2014.

This application claims the benefit under 35 USC 119(e) of U.S. Provisional Application Nos. 62/164,054, filed on May 20, 2015; 62/181,434, filed on Jun. 18, 2015; 62/185,349, filed on Jun. 26, 2015, and 62/193,907, filed on Jul. 17, 2015, all of which are incorporated herein by reference in their entirety.

This application is related to:

U.S. application Ser. No. 15/160,736, now U.S. Patent Publication No. US 2016-0284183 A1, filed on May 20, 2016, entitled "Tailgating Detection in Frictionless Access Control System" by James Trani;

U.S. application Ser. No. 15/160,753, now U.S. Patent Publication No. US 2016-0267760 A1, filed on May 20, 2016, entitled "Video Recognition in Frictionless Access Control System," by James Trani;

U.S. application Ser. No. 15/160,765, now U.S. Patent Publication No. US 2016-0343187 A1, and International Application No. PCT/US2016/033597, now International Publication No. WO 2016/187573, both filed on May 20, 2016, entitled "Frictionless Access System for Public Access Point," by James Trani; and U.S. application Ser. No. 15/160,775, now U.S. Patent Publication No. US 2016-0344091 A1, and International Application No. PCT/US16/033600, now International Publication No. WO 2016/187574, both filed on May 20, 2016, entitled "Portable Device having Directional BLE Antenna," by James Trani.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (NNTRs), and door controllers, to list a few examples.

The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read the information of the keycards and then the access control systems determine if the individuals are authorized to access the restricted areas, the individuals are authorized to enter the restricted areas, then the access control readers allow access to the restricted areas by unlocking locked doors, signaling that doors should be unlocked, or generating alarms upon unauthorized entry, for example.

SUMMARY OF THE INVENTION

Traditional security systems using access control readers have limitations. The systems require the individuals to present access cards to the card reader at each access point to in access to the restricted areas. Individuals typically must place their access cards such that the access cards either make direct physical contact with the access readers or are within a few inches of the access readers. This formal interaction process can be an inconvenience to the users of the system.

In contrast, the present system is directed to a frictionless access control and tracking system. A frictionless system uses wireless technology that enables a more transparent method for identifying and tracking individuals while providing similar access control and tracking as traditional systems and methods. The present system can automatically identify and track individuals and enable access to restricted areas when authorized individuals are approaching or in threshold areas of the access points. Threshold areas are typically areas within close proximity to the access points, such as entrances of the restricted areas, such as an area near a locked access point, in one example. Access points include interior or exterior doors of a building, or elevators, in examples. Frictionless systems accomplish these tasks without requiring the individuals to swipe or wave keycards, for example, at card readers, and can more continuously track those users in and around buildings.

In the present system, users carry active wireless devices on their person that transmit credentials which identify the users to a wireless receiving device, or positioning unit. Credentials are also known as user information. The active wireless user devices, or user devices, include electronic devices such as key fobs (or fobs) or mobile computing devices such as smart phones or tablet computing devices. These user devices broadcast the user information in data packets, also known as packet data. The packet data are received by positioning units. The positioning units preferably include two or more antennas.

The positioning units can then determine locations of the user devices (and thus the locations of the users) by using various positioning techniques of the antennas. The determined locations can be an actual 2-D or 3-D position or simply whether the user device is near to a threshold, or not. The positioning units then convert the locations of the users into location data.

The positioning units send the packet data and the location data to a verification and tracking system, which authenticates the users. Additionally, the verification and tracking system sends signals to door controllers to unlock the access points and to allow access to restricted areas associated with the access points when the positioning units determine that user devices (and thus the users) are in the immediate vicinity of/close proximity to the door or other access point.

Additionally, the system is able to detect on which side of the access point the user is located and his/her physical presence within close proximity of the access point, Typically, the system determines user proximity to a door or other access point when two conditions are satisfied. First, the user must be located within a threshold area of the door, which is typically an area within two feet or less from the door handle. Second, the user must typically be stationary at the door for a minimum time period and not moving past the door.

In addition to determining close proximity of a user to an access point, the system is able to detect loitering of users for a period of time relative to an access point. This is also known as lingering of the users Typically, the system determines whether users are lingering near an access point by determining that a user is located within a threshold area of the access point and then remain within the threshold area for a pre-determined period of time, also known as a lingering value.

The present system provides additional advantages over traditional systems and methods. In one example, low power conditions of the user devices can be determined by comparing signal strength of the wireless signals received from the user devices to a range of signal strength threshold values. Moreover, in embodiments, the verification and tracking system or the position unit of the system can pre-authorize the users for entry to the access point as the user devices carried by the users are within range and/or approaching a threshold area of the access point. Once the pre-authorized users then come within the threshold area, the verification and tracking system or the positioning unit can signal a door controller to open the access point with a low latency. This enables authorized users to access the restricted areas associated with each access point in a more time-efficient manner than current access control systems and methods.

In general, according to one aspect, the invention features an access control system for monitoring an access point. The system comprises a positioning unit for tracking locations of users relative to the access point. The positioning unit includes a primary antenna that receives wireless signals from user devices of the users and a directional antenna that preferentially receives the wireless signals from the user devices from a threshold area of the access point.

In examples, the user devices include fobs and smart phones. Also, the primary antenna is an omnidirectional antenna.

The positioning unit can identify a low power condition of the user devices hy determining a signal strength of the wireless signals sent from the user devices and comparing the determined signal strength to a range of signal strength threshold values.

In one example, the positioning unit tracks the locations of the user devices relative to the access point by comparing relative signal strengths of the received wireless signals between the primary antenna and the directional antenna.

The positioning unit can also tracks the locations of the user devices relative to the access points by triangulating based on the times when the wireless signals were received at the positioning unit.

In general, according to another aspect, the invention features a method for controlling access of users to an access point. The method comprises tracking locations of users relative to the access point via a positioning unit associated with the access point, the positioning unit tracking the locations by comparing of the wireless signals received a primary antenna and a directional antenna. The positioning unit also receives user information for identifying the users.

In general, according to another aspect, the invention features an access control system that detects low power conditions of user devices carried by users. The system comprises a positioning unit for tracking locations of the users relative to an access point, wherein the positioning unit detects the low power condition of the user devices by determining a signal strength of the wireless signals sent from the user devices and comparing the determined signal strength to a range of signal strength threshold values.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS in the accompanying drawings, reference characters refer to the same parts throughout the different views. The drawings are not necessarily to scale; emphasis has instead been placed upon illustrating the principles of the invention. Of the drawings.

Figure 4A:
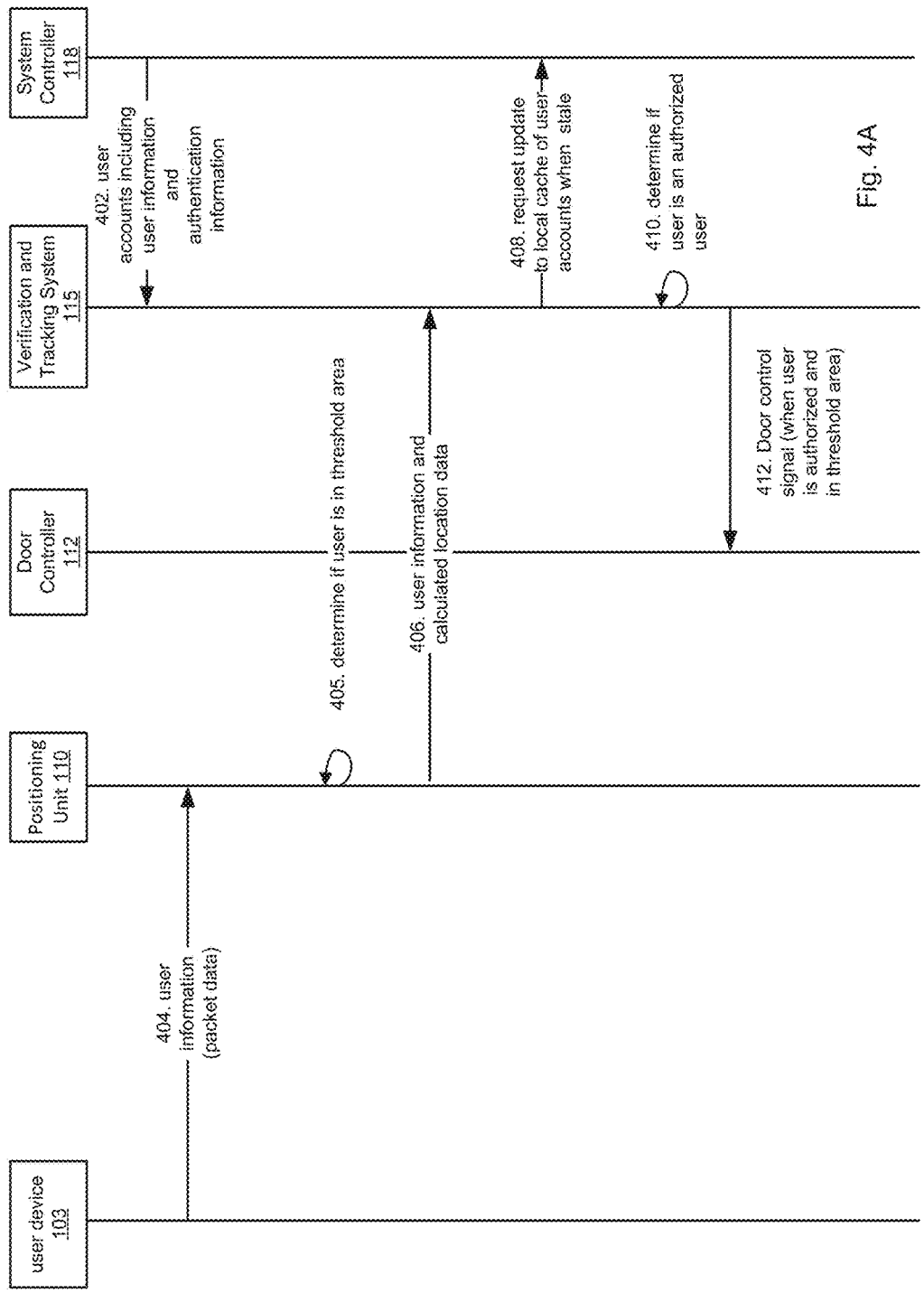
Figure 4B:
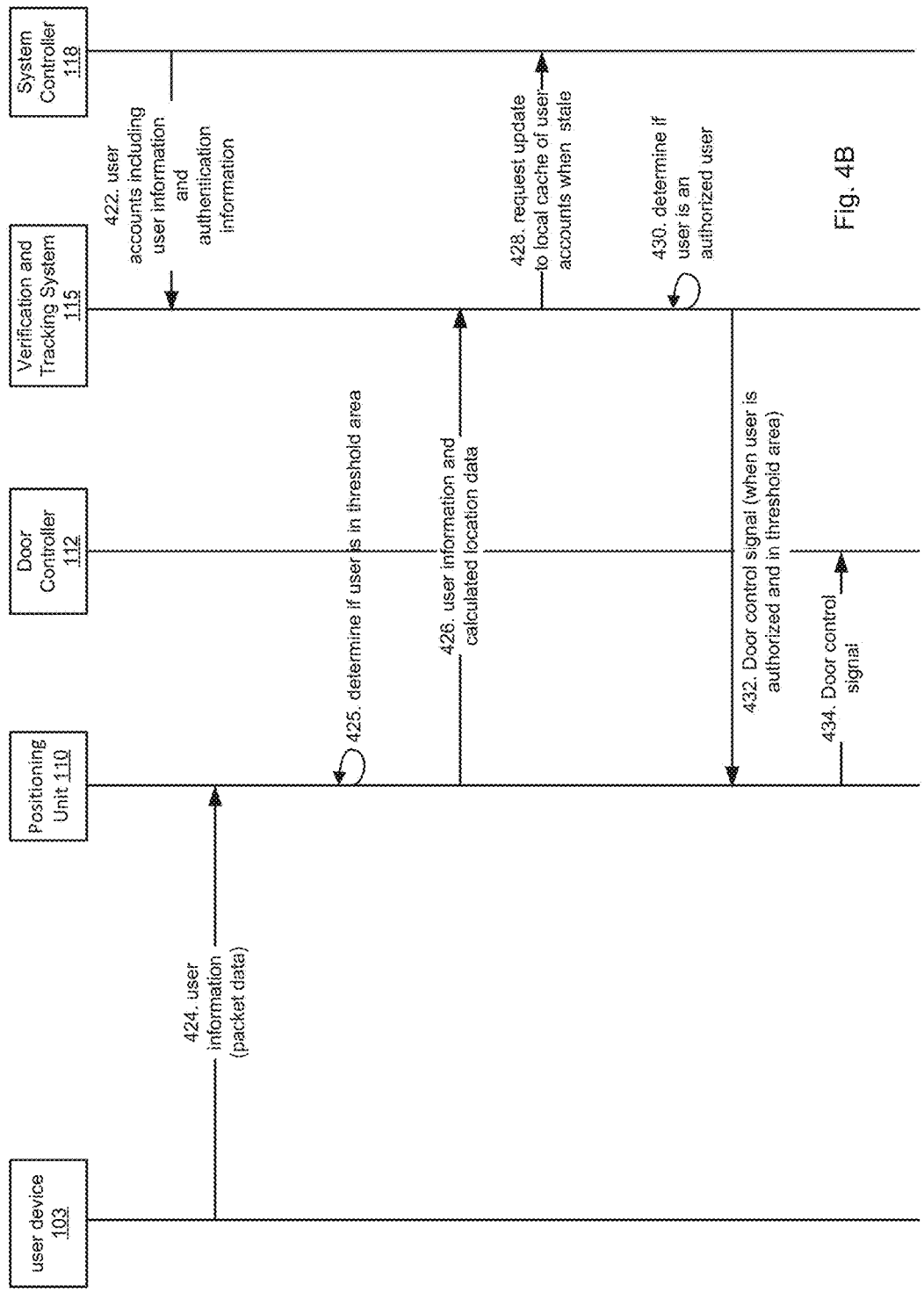
Figure 5A:
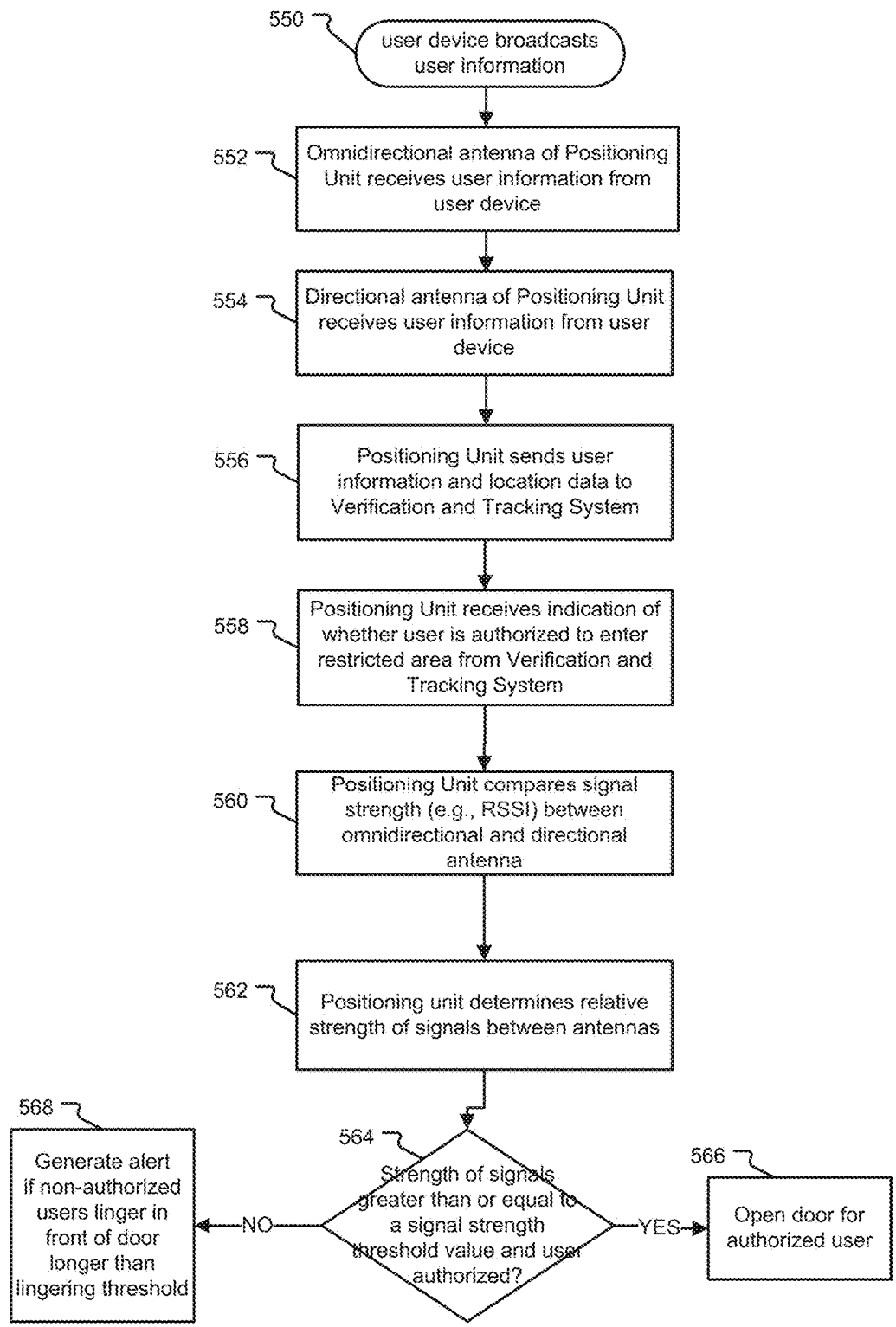
Figure 5B:
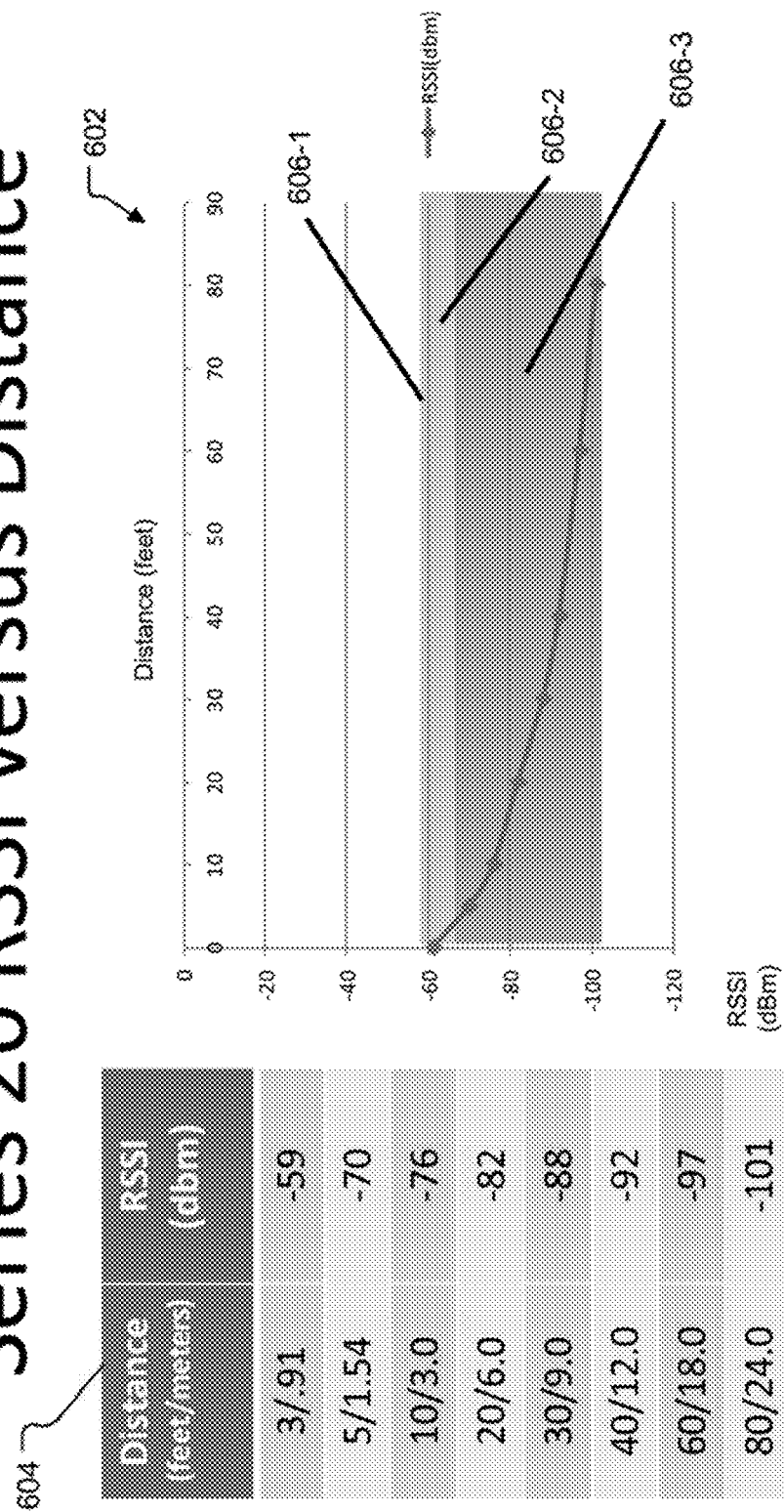
Figure 6:
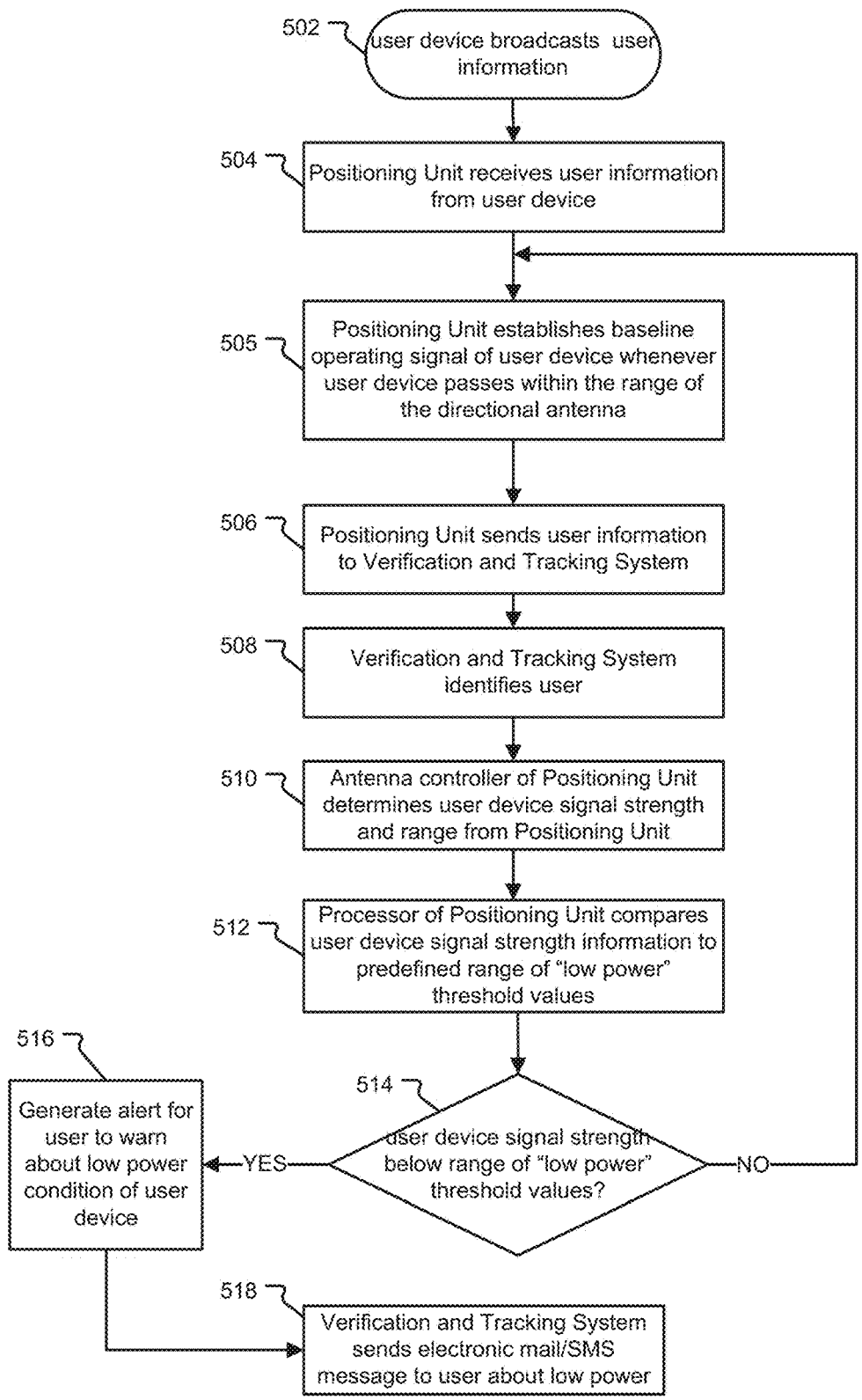
Figure 7:
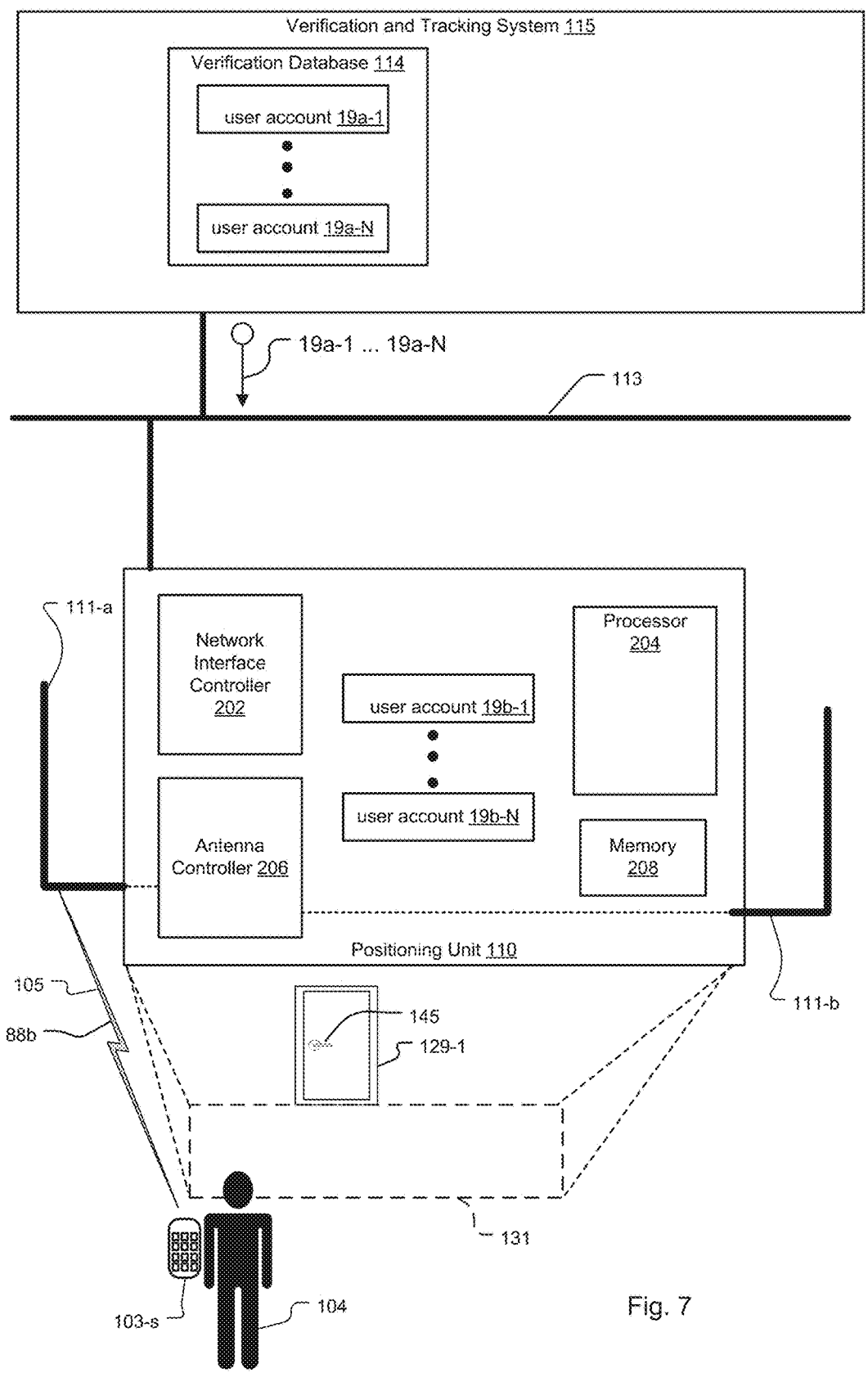

FIG. 4A-4D are sequence diagrams for four exemplary implementations of the access control system for providing users with access to a restricted area, where the sequence diagrams illustrate the interactions between a mobile active wireless user device (e.g., mobile computing device, e.g., a smartphone, or fob), the positioning unit, a door controller, a verification and tracking system, and a system controller of each implementation, and where: FIG. 4A describes how the verification and tracking system authorizes a user and sends a signal to unlock a door, after the user has entered the threshold area of the door; FIG. 4B describes how the verification and tracking system authorizes the user and the positioning unit then sends a signal to unlock the door, after the user has entered the threshold area of the door;

FIG. 4C describes how the verification and tracking system can pre-authorize the user as the user approaches the threshold area of the door; and FIG. 4D describes how the positioning unit can pre-authorize the user as the user approaches the threshold area of the door;

FIG. 5A is a flowchart illustrating how the positioning unit tracks a user by determining the location of a user based on the signal characteristics of a mobile active wireless user device carried by the user;

FIG. 5B shows both a graph of Received Signal Strength Indication (RSSI) vs. distance values plotted for a typical BLE user device communicating with a positioning unit, and an associated table of exemplary RSSI vs distance values from the graph, according to principles of the present invention;

FIG. 6 is a flowchart illustrating how the positioning unit can detect low power levels for a user device based on the strength of the wireless signals sent from the user device, also known as power level verification for a user device; and FIG. 7 is a schematic diagram that provides more detail for how the positioning unit as described in FIG. 4D can preauthorize users via a local cache including information for identifying and authorizing the users, and for how the positioning unit receives updates to its local cache.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
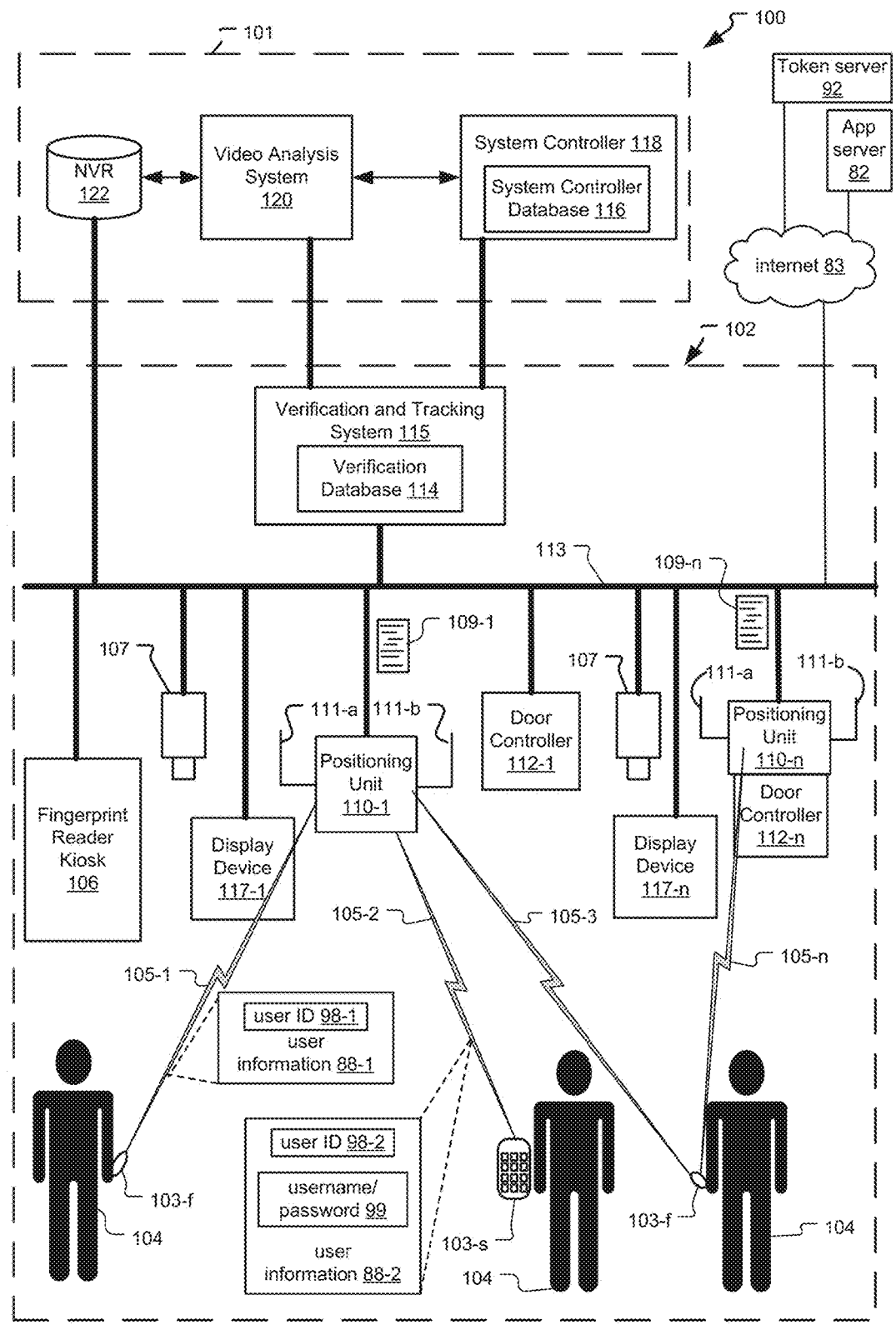
FIG. 1 is a schematic diagram of an access control system that identifies users, tracks locations of active wireless devices, and controls access to different and/or restricted areas.

FIG. 1 is a schematic diagram of an exemplary access control system 100 that identifies users 104, tracks locations of user devices 103 such as fobs 103-*f* and smart phones 103-*s* or other mobile computing devices, and enables access to restricted areas of a premises such as a building 102. In the example, the access control system 100 is distributed between two or more locations or buildings 102. The system also includes backend components such as a system controller 118, a video analysis system 120, and a network video recorder 122 that are typically located in a security control room 101 or other secure location of the building 102. Alternatively, one or more of these components could be part of a remote service network such as a cloud-based network, or "cloud."

The system 100 also includes a verification and tracking system 115, and positioning units 110, and may further include additional components such as video cameras 107, a fingerprint reader kiosk 106, display devices 117, and door controllers 112. These devices are usually located within and/or adjacent to the building 102 that is being protected and/or secured by the system 100. These components communicate with one another over a data network 113. The positioning units 110 are located near access points of the building 102 or areas within the buildings such as door access points 129 that enable users 104 to physically enter or exit the building 102 or access different parts. On the other hand, the verification and tracking system 115 will typically control multiple positioning units 110. However, in some still other implementations, the verification and tracking system 115 could be integrated in the same box as the positioning unit 110.

In a typical implementation, users 104 carry user devices 103 (fobs, smartphones, tablets, phablets, or other mobile computing devices), which broadcast packet data 105-1 to 105-*n*. The packet data 105 includes user information 88 for identifying the users. The user information 88 can include a unique user ID 98 for each of the user devices 103 and other information for identifying the user such as a username/password 99, name of user, department, work extension, personal phone numbers, email addresses, and employee II) number, in examples. In one example, the user ID 98 includes a token or a hash of the token generated for the user 104, and it may or may not expire after a predetermined time.

In yet another example, a rolling security identification (id) or access code generated within the fob/user device 103 functions as the user ID 98. A rolling access code is a unique authentication code for each user 104. Each mobile phone user device 103 preferably transmits the access code at fixed periodic intervals.

The access code includes a random key or "seed" that is different for each fob/user device 103. The uniqueness of each key is accomplished by including the unique phone number of each mobile phone during calculation of the key, for example. In one implementation, the user II) 98 for user devices 103 is a token generated for each user. Typically, the token will include a TOTP (Time-based One Time Password) combined with the rolling security identification (id) code, or rolling code, maintained within the user device 103. A rolling code typically generates an authentication code associated with each user 104 at fixed intervals. The mobile phone 103 creates a security token from the key, and generates a 16 byte hash of the security token. The mobile phone 103 then includes the hash of the security token as payload within packet data 105 and broadcasts the packet data in wireless signals via Bluetooth.

Users carrying the user devices 103 enroll and/or register the user devices 103 with the system controller 118. When the user device is a fob 103-*f*, users access the system controller 118 to enroll the fob via a client application of the system controller 118. When the user device is a smart phone or other mobile computing device, 103-*s*, the users 104 download a security app from the app server 82 to their user device 103-*s*, where the security app provides access to the system controller 118.

During the enrollment/registration process, the users 104 enter the user information 88 to create a user account 19 for each user on the system controller 118. For a fob user device 103-*f*, users provide the unique ID of the fob such as its Media Access Control (MAC) address as the user ID 98-1 of the user information 88-1. For a mobile phone (e.g. "smart phone") user device 103-*s*, users typically include the phone number of the user device 103-*s* as the user ID 98-2 of the user information 88-2. Users can additionally include other user information 88 for identifying the users such as a username/password combination 99. In response, a user account 19 is created on the system controller 118 for the user with the specified user information 88. More detail concerning user accounts 19 follows the description of FIG. 2, included herein below.

An administrator will typically add authorization information 46 associated with each of the users 104 to the user account 19 based on security objectives. Authorization information 46 determines which users 104 are authorized to access specified restricted buildings or areas of a building 102. In one implementation, the authorization information 46 is provided as a separate access control list for each door controller 112, where the authorization information includes the user information 88 of users that are authorized to access each door controller 112. In another implementation, the authorization information 46 is a single access control list that identifies all door controllers 112-1 through 112-$n$ and the users that are authorized to access the door controllers 112-1 through 112-$n$.

When enrolling a smart phone user device 103-$s$ with a token as the user ID 98, the smart phone user devices 103 and the system controller 118 first access a token server 92 to request the token. In one implementation, the user, via the security app, includes the phone number of the user device in a request message to the token server 92. In response, the token server 92 generates a token, and sends the token to both the system controller 118 and the user device 103 in response. The token server 92 preferably sends the token to the user device in an SMS message. The token is then included as the user ID 98 within the user information 88 for the user, for both the user information 88 maintained for the user in the system controller 118 and the user information 88 included within the user device 103.

The wireless packet data broadcast from the user devices 103 is preferably secured to prevent unauthorized third parties from intercepting and viewing the packet data 105 during transmission (i.e. during broadcasts). In one example, the packet data 105 is encrypted. In a preferred embodiment, the user devices 103 broadcast the packet data 105 using BLE (Bluetooth low energy) technology.

Bluetooth is a wireless technology that operates in a 2.4 GHz gahertz) short-range radio frequency band. In free space, Bluetooth applications typically locate a Bluetooth device by calculating the distance of the user devices 103 from the signal receivers. The distance of the device from the receiver is closely related to the strength of the signal received from the device. A lower power version of standard Bluetooth called Bluetooth Low Energy (BLE), in contrast, consumes between ½ and 1/100 the power of classic Bluetooth. BLE is optimized for devices requiring maximum battery life, as compared to the emphasis upon higher data transfer rates associated with classic Bluetooth. BLE has a typical broadcast range of about 100-150 feet (approximately 35-46 meters).

When transmitting via BLE, the user devices 103 might send an AltBeacon compliant BLE broadcast message every second. If the user devices 103 utilize tokens as the user ID 98, the user devices 103 preferably include a hash representation of the token/user ID 98 in the BLE broadcast messages. In one implementation, the hash representation of the token is a 16-byte, one-way hash of the token, computed using the phone number of the user device 103-$s$ as the seed key.

In an alternative implementation, the user devices 103 are capable of broadcasting via standard Bluetooth. In still other alternative implementations, the user devices 103 may broadcast via other wireless technologies such as (IEEE 802.11), active RFID (radio frequency identification), or ZigBee, to list a few examples.

The positioning units 110 each preferably include two or more antennas 111. The packet data 105 are received by antennas 111-$a$, 111-$b$ of one or more positioning units 110-1 to 110-$n$, which are located throughout the building 102. The positioning units 110-1 to 110-$n$ determine locations of the users 104 using one or more positioning techniques.

A preferred positioning technique compares the relative signal strengths of the received wireless signals between two antennas 111 of the positioning unit 110. Another positioning technique includes determining time of flight or time of receipt of packet data 105 received at each of the antennas 111 of a positioning unit 110. In yet another positioning technique example, the positioning units 110 employ triangulation between two or more positioning units 110 installed within the building. The positioning units 110 then convert the locations of the users 104 into location data 109 for each of the users. This will typically require the positioning units to share a common reference clock.

The positioning units 110-1 to 110-$n$ receive the packet data 105 including the user information 88 for each user, and then send the user information 88 and the location data 109 to the verification and tracking system 115 via a data network 113. When the user devices 103 utilize tokens as the user ID 98, the positioning units 110 might extract the tokens from the hash representations of the tokens included in the packet data 105. The positioning units 110 use the phone number of the user devices 103 or other reference as the seed key for this purpose. The location data 109 are used by the verification and tracking system 115 to determine motion vectors for and to predict motion intent of the users 104, in examples.

Typically, the data network 113 is a Local Area Network (LAN) such as wired or wireless Ethernet. The positioning units 110-1 to 110-$n$ can also communicate with the verification and tracking system 115 via serial connections, in another example.

As the users 104 and their user devices 103 move through the building 102, the tracking of the user devices 103 and therefore of the users 104 is often "handed off" to other positioning units 110 in order to reduce or eliminate tracking blind spots within the building 107.

The verification and tracking system 115 accesses authorization information 46 in a verification database 114, which it maintains or which it simply accesses, to determine which users 104 are authorized to access specified restricted areas of a building 102 and/or pass through an access point. Once the users 104 are authenticated by the verification and tracking system 115, the verification and tracking system 115 sends a door control signal via the network 113 to the door controller 112-1, in one example. The door controller 112-1 then enables access to a restricted area by unlocking an access point of the restricted area, such as a door 129 or other portal, thereby providing access for the authorized user 104 to the restricted area while also possibly generating an alarm for an unauthorized user. The door controller 112-1 preferably unlocks the door 129 when the authorized user 104 is within a threshold area 131 near the access point (e.g., the door or other portal) of the restricted area.

The door controllers 112-$n$ can also be directly coupled to the positioning units 110-$n$. In this implementation, the verification and tracking system 115 sends door control signals via the network 113 to the positioning units 110-$n$, which in turn activate their door controllers 112-$n$ to enable access to the restricted areas.

In a typical implementation, the system 100 includes the system controller 118, which includes a system controller database 116. In general, the system controller 118 might store various user information 88 for each of the users 104 to the system controller database 116. The system controller database 116 also stores the authorization information 46 for the users 104 (e.g., which users 104 are permitted to access which restricted areas). Periodically, the system controller 118 sends updated user information 88 and authorization information 46 to the verification and tracking system 115 via the network 113. In response, the verification and tracking system 115 saves the received user information 88 and authorization information 46 to its verification database 114.

The verification and tracking system 115 accesses the user information 88 and authorization information 46 within its verification database 114, which acts as a local copy or "cache" of the information. To manage the temporal relevance of the entries in its verification database 114, verification and tracking system 115 maintains a current time, and applies a time stamp to each item of user information 88 and authorization information 46 received from the system controller 118.

In the exemplary system 100, the video cameras 107 record video data, which are sent via the network 113 to the network video recorder 122 to store the video data. Typically, time and date information are added to video data to enable the data to be indexed and reviewed at a later date. This information is also known as video metadata. The video analysis system 120 analyzes video data and may associate metadata to moving objects e.g., people), numbers of moving objects, and specific users, to list a few examples.

The verification and tracking system 115 then sends the location data 109 in conjunction with the video data from the video cameras 107 to the video analysis system 120 for analysis. The video analysis system 120 typically analyzes the location data 109 with the video data from the video cameras 107 to verify that the user is a proper user. In one example, video identification information 91 such as facial image information that the video analysis system 120 determines from the video data is used to confirm that the individuals possessing the user devices 103 are the proper users 104. This safeguards against an event such as when a user device 103 for a valid employee user 104 of a business is stolen or lost, and a different individual (e.g. other valid user 104, former employee of the business, or criminal) attempts to gain access to a restricted area of the building via the same user device 103. In other examples, the video analysis system 120 analyzes the tracking information provided by the location data 109 in conjunction with the video data to determine which individuals in a scene are users (holding users devices 103) and which are non-users (not holding user devices 103).

Typical embodiments of the system 100 include display devices 117-1 to 117-n. These display devices 117-1 to 117-n could be screens of access control readers or standalone display devices (e.g., LCD screen), for example. In one embodiment, the display devices 117-1 to 117-n are wirelessly connected to the network 113. In an alternative embodiment, the display devices 117-1 to 117-n are connected via wired connections and receive power via PoE (power over Ethernet).

The display devices 117-1 to 117-n, if used, display messages to the users 104 such as "access granted", "access denied", warnings about low power conditions of the user devices 103 or warnings about emergency situations, in examples. Additionally, personalized messages may be directed towards specific users regarding personal and/or work matters. For example, a message could be generated by a supervisor attempting to locate an employee user. In another example, a message could be generated indicating that a family member and/or relative of the user are attempting to contact the user 104. These messages can be efficiently targeted at the intended recipient since the user location information 109 is known and thus it is known when they are in front of a display device 117, for example.

Typically, low power conditions of the user devices 103 are identified by the positioning units in response to the positioning units determining a signal strength of the wireless signals sent from the user devices 103, and comparing the determined signal strength to a range of expected/threshold signal strength values maintained by the positioning units 110. The range of expected signal values additionally take into account the distance between the user device and the positioning units 110.

A fingerprint reader kiosk 106 may also be deployed in some embodiments of the system 100. In some high-security situations, users are required to periodically return to the fingerprint reader kiosk 106 and scan their fingerprint(s) to re-authenticate with the system 100. This process helps ensure that the user in possession of the fob or other user device 103 is also the registered owner of the user device 103.

While not shown in the illustrated figures, fingerprint scanners may be implemented in the fobs or mobile computing devices 103, in still other examples. In this scenario, the users 104 would not have to periodically return to the fingerprint reader kiosk 106. Rather, the users would periodically authenticate themselves via the fingerprint reader integrated within the user devices 103.

Figure 2:
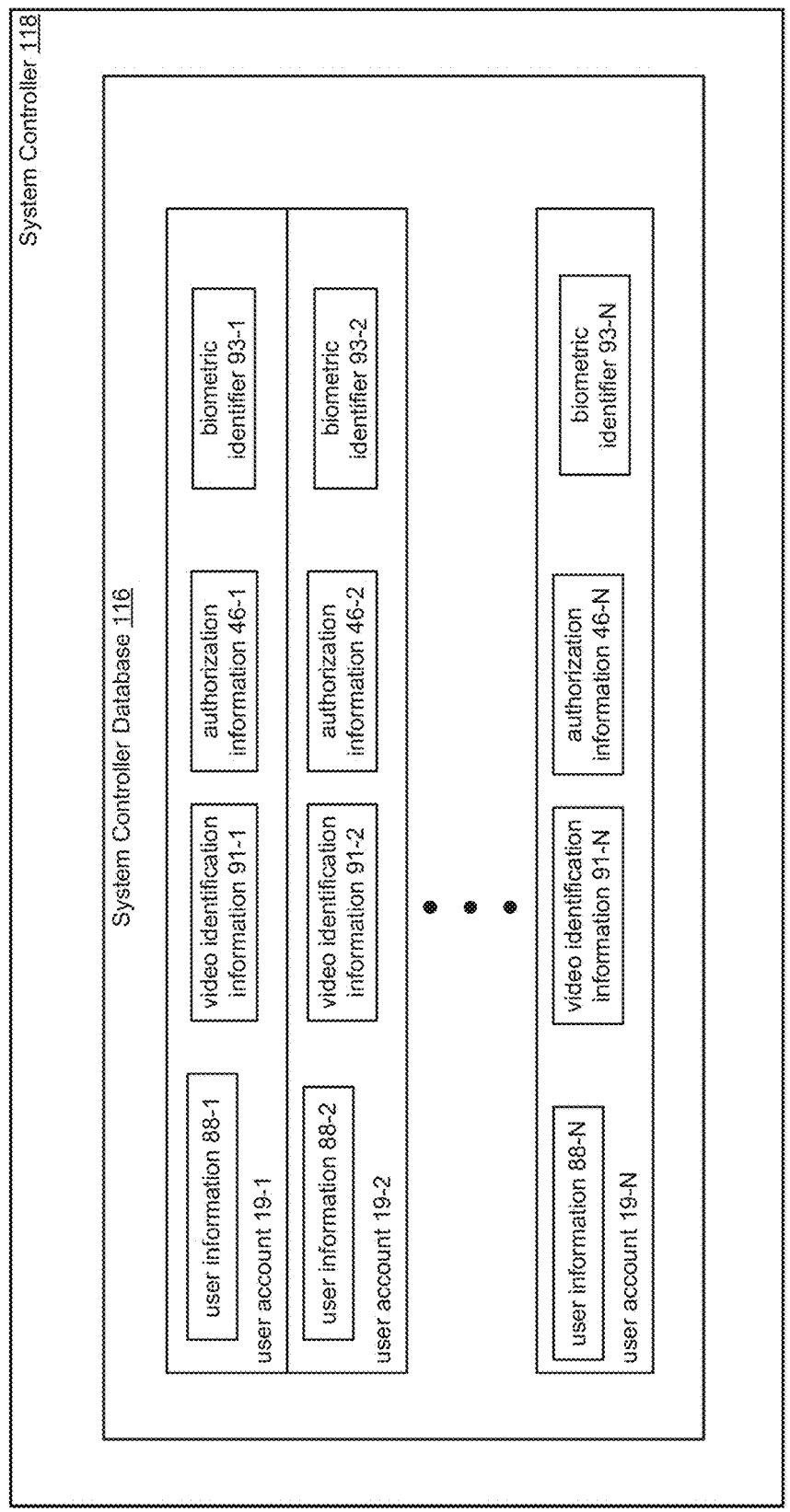
FIG. 2 is a block diagram illustrating detail for exemplary user accounts stored for each user within a system controller of the access control system, where each user account includes different types of information for identifying the users and confirming the identity of the users.

FIG. 2 shows exemplary user account records, or user accounts 19, stored for each of the users within the system controller database 116. Each user account 19 includes information such as user information 88, authorization information 46, video identification information 91, and biometric identifiers 93 for each of the users. Exemplary user accounts 19-1, 19-2, and 19-N are shown. The access control system 100 references the set of user accounts 19 to authorize users 104 at the access points 129, and to confirm the identity of the authorized users at the access points 129, in examples.

A system administrator creates an initial user account 19 for each user of the access control system 100. The system administrator and/or the user create user information 88 for each user such as a unique ID 98, and username/password combination 99. The system administrator, based on security policies, creates authorization information 46 for each user that indicates which access points 129 each user is authorized to pass through.

In another example, video identification information 91 can be stored for each user. Video identification information 91 includes physical characteristics of the users that are obtained from analyzing video data of the users. Examples of video identification information 91 include facial image information and gait information, clothing worn, and tattoos, in examples. In yet another example, biometric identifiers 93 can be created for each user 104, where biometric identifiers include fingerprints and iris scans of the user, in examples.

It is also important to note that the user accounts 19 can be stored elsewhere within the access control system 100. In one implementation, the system controller 118 can periodically send the user accounts 19 to the verification and tracking system 115 for storing the user accounts 19 to the verification database 114. In this way, the user accounts 19 within the verification and tracking system 115 act as a "local cache" of user accounts 19. Moreover, the verification and tracking system 115 can then send the user accounts 19 to the positioning unit 110 for storage to a local cache of user accounts 19 within the positioning unit 110.

Figure 3A:
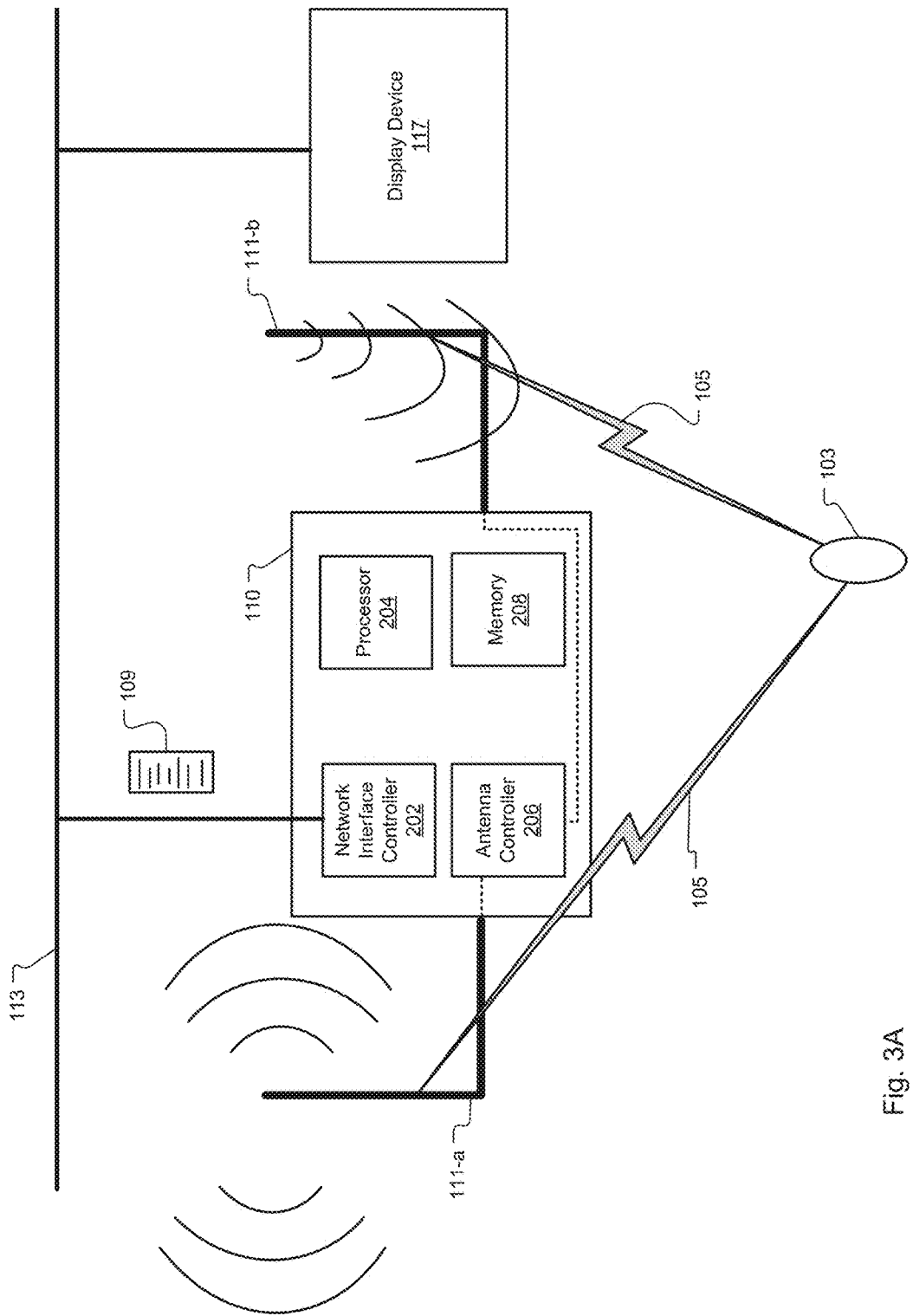
FIG. 3A is a schematic diagram illustrating a preferred embodiment of a positioning unit at an access point of a premises, where the positioning unit includes one omnidirectional antenna and one directional antenna for determining a location of an active wireless device such as a fob or mobile computing device.

FIG. 3A is a schematic diagram illustrating a preferred embodiment of the positioning unit 110, which includes at least two antennas 111-a, ill-b (e.g., one omnidirectional antenna and one directional antenna) for determining a location of a fob or other user device 103-f or mobile computing device (e.g., a smartphone 103-s). Preferably, Bluetooth Low Energy (BLE) is the wireless technology used for communications between the user devices 103 and the positioning units 110.

In a BLE-enabled system, users carry an active BLE device on their person that transmits their user information 88 including user IDs 98 to one or more BLE-enabled positioning units 110 located in different places throughout a building 102. However, the characteristics of Bluetooth signals can present challenges when determining the location of an individual relative to access points of a building 102. This especially impacts BLE because of its lower power and therefore more limited distance range as compared to standard Bluetooth signals.

When BLE receivers such as positioning units 110 are installed in buildings 102, objects and obstructions such as walls and furniture located in the vicinity of the access points can adversely affect or enhance the reception of Bluetooth signals. This is because the objects absorb, reflect and refract radio waves in different ways and in different amounts. As a result, Bluetooth signals can scatter to the point of becoming directionless. This can severely limit the distance-signal strength relationship between the user devices 103 and the positioning units 110 and therefore the ability of the positioning units 110 to locate and track the user devices 103.

To solve this problem, the positioning system 110 includes two antennas 111-a and 111-b for determining the location of a fob 103-f or mobile computing device (e.g., a smartphone 103-s) as the user devices 103. In one example, the first antenna 111-a and the second antenna 111-b are both BLE antennas. In the preferred embodiment, the first antenna 111-a is an omnidirectional antenna and the second antenna 111-b is a directional antenna. More generally, the second antenna 111-b only needs to be more directional than the first antenna 111-a. The antennas 111 detect packet data 105 broadcast by user devices 103, which are carried by the users 104 or are located on their person.

Typically, the directional BLE antenna 111-b establishes the close proximity of a user 104 to an access point such as a door 129, and the omnidirectional BLE antenna 111-a allows the system 100 to continuously monitor (e.g. track) the locations of the users 104. In one implementation, the directional antenna can receive BLE broadcasts from user devices 103 located typically within a 3 foot by 3 foot region or threshold area 131 in front of a door access point 129. The door access point 129, in turn, enables access to a restricted area of a building 102. In contrast, the omnidirectional antenna 111-b can receive BLE broadcasts sent from user devices 103 in all locations/directions. Typically, the omnidirectional antenna 111-b can receive BLE broadcasts sent from user devices 103 located beyond the threshold area 131 but that are also still within the signal range of the omnidirectional antenna 111-b.

Using positioning techniques (e.g., time of flight to each antenna, triangulation with other positioning units, and/or signal strength calculations), the positioning unit 110 is able to determine the location of the user devices 103. Additionally, the use of an omnidirectional antenna 111-a and a directional antenna 111-b enable finer granularity in the location calculations since the directional antenna 111-b can be used to generate finer location information within a specific region such as a door threshold.

In the illustrated example, the positioning unit 110 includes a network interface controller 202, a processor 204, an antenna controller 206, and memory 208. The network interface controller 202 provides an interface with the network 113. This enables the positioning unit 110 to communicate with the verification and tracking system 115 and the door controllers 112-1 to 112-n.

Figure 3B:
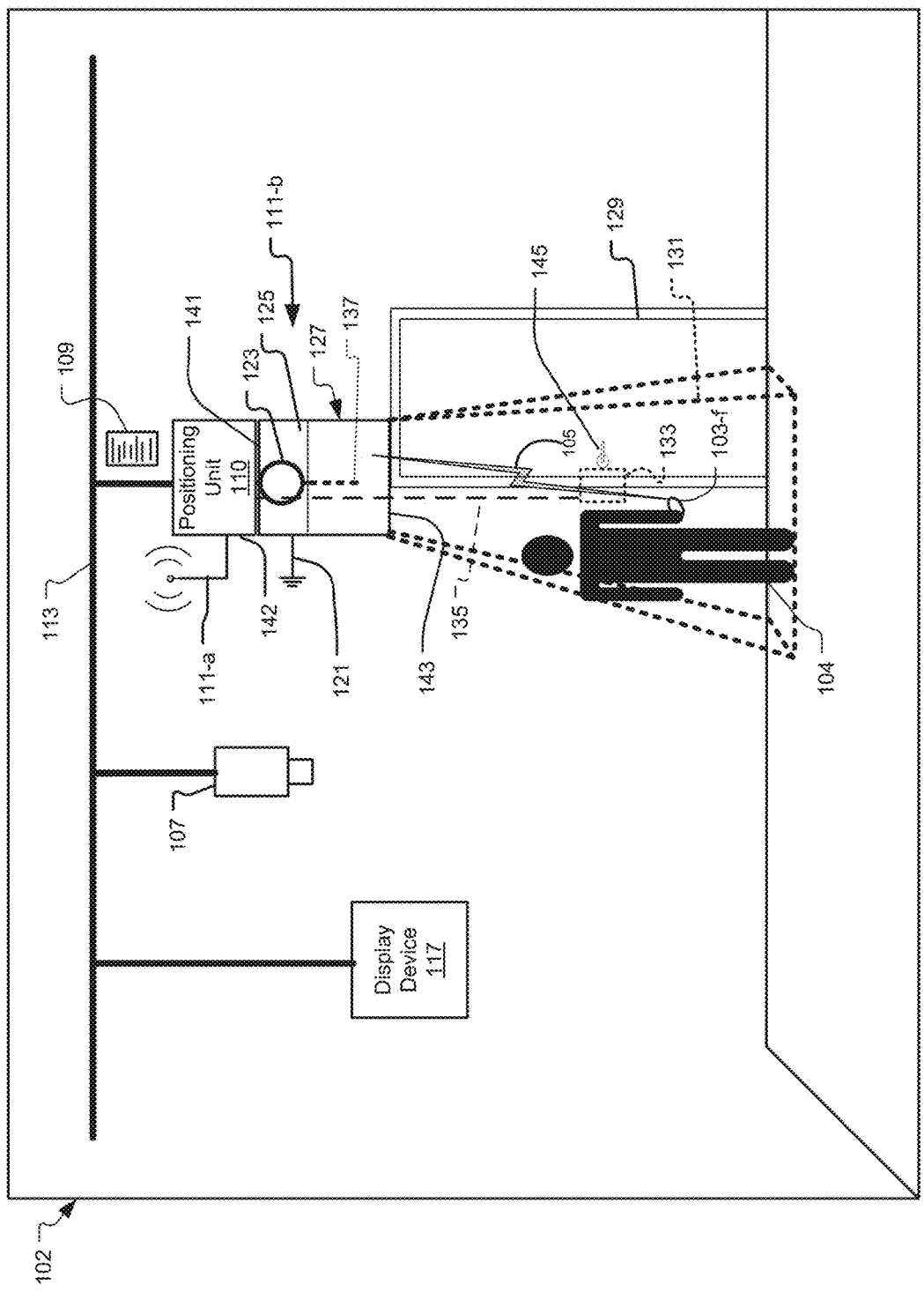
FIG. 3B is a schematic diagram illustrating an embodiment of the positioning unit with an omnidirectional antenna that is housed within an enclosure to create a directional antenna, where the positioning unit is located near an access point of the premises.

FIG. 3B is a schematic diagram illustrating another embodiment of the positioning unit 110 that also includes an omnidirectional antenna 111-a and a directional antenna 111-b. The directional antenna 111-b comprises an omnidirectional antenna 137 that is housed within an enclosure 127, e.g., antenna horn, to form the directional antenna 111-b. The directional antenna 111-b is preferably oriented towards a door striker 133 of a door 129 access point. The door striker 133 is typically integrated with or located adjacent to a door handle 145 of the door 129.

In the illustrated example, the positioning unit 110 includes the omnidirectional antenna 111-a mounted to the exterior surface 142 of a housing of the positioning unit 110 to continuously monitor the locations of users 104. Additionally, a door striker 133 is electrically coupled to the positioning unit 110 via a connection (e.g., universal serial bus) 135, which is typically installed within the walls of the building 102.

The directional antenna 111-b is created, in one implementation, by housing the omnidirectional antenna 137 within a grounded (e.g., ref. numeral 121) partial Faraday enclosure (enclosure) 127 of the positioning unit 110 to create directionality. In one example, the enclosure 127 is fabricated from aluminum, but other conductive materials known in the art could also be used. In a typical implementation, the enclosure 127 includes copper shielding (e.g., copper mesh) 125. Preferably, the shielding and enclosure are designed to shield the omnidirectional antenna 137 from 2.4 GEL signals arriving from the front, back, top, and sides of the enclosure 127. In another implementation, the directional antenna is a patch array antenna, where the patches in the array are built using microstrip technology.

A bottom 143 of the enclosure 127 is left open to create an aperture and allows the entrance of wireless signals such as 2.4 GHz Bluetooth signals. The waves travel upward from the bottom 143 of the enclosure 127 towards the second omnidirectional antenna 137, which is preferably mounted at a top 141 of the enclosure 127. Typically, the length of the enclosure 127 is adjustable based on the required/desired angle of incidence for the threshold area 131 near the locked door 129.

More generally, the enclosure 127 comprises a flaring, preferably, metal waveguide that has a typically rectangular, square or circular aperture and a generally pyramidal or conical shape with the omnidirectional antenna 137 located at or near the vertex. The aperture is preferably oriented towards a door striker 133 of a door 129 access point. In some embodiments, two omnidirectional antennas 137 are located at the vertex at right angles to each other to avoid polarization sensitivity.

In a current embodiment, the enclosure 127 is approximately 5 inches wide and 7 inches long (13 centimeters by 18 centimeters) or less and 2 inches (5 centimeters) in depth, or less. Preferably, these dimensions create an adaptive waveguide for 2.4 GHz Bluetooth signals. In alternative embodiments, the dimensions (e.g., length, width, depth) of the enclosure 127 and the shape of the aperture (e.g., opening) of the enclosure 127 may be altered depending on the required/desired angle of incidence for the threshold area 131. Additionally, the dimensions may also be adjusted depending on a desired operating frequency of the wireless technology of the second antenna 111-*b*.

In yet another alternative embodiment, the enclosure 127 is fabricated with extendable and/or collapsible walls and/or hinged sections (not shown) to allow the aperture to be adjusted, typically at the time of installation.

Generally, the aperture of the enclosure 127 is designed to allow the passing of a 2.4 GHz wave upward from the bottom of the enclosure 127 to the omnidirectional antenna 137 and then to a receiver (e.g., Bluetooth receiver), which is installed within the enclosure 127 and mounted to the top wall of the enclosure 127 or adjacent to the enclosure. Typically, the Faraday enclosure 127 does not completely block radio waves from the sides and top of the enclosure. The waves from the sides and top of the enclosure 127 are only partially attenuated. In one embodiment, the enclosure 127 and omnidirectional antenna 137 are attached to a gimbal 123, which allows for precise adjustment of the directionality of the antenna such that its aperture is directed at the threshold area 131.

In a typical implementation, the threshold area 131 is defined by the projected aperture of the directional antenna 111-*b* and is approximately 3 feet (or approximately 1 meter) deep (e.g., distance out from the door) and includes a width of that typically ranges between 3-6 feet (e.g., 1-2 meters). Additionally, the threshold area 131 is generally installed off-center from the door 129 to account for an opening and closing arc of the door 129, often being centered on the door handle 145.

In other examples, where the access point is a hallway, the projected aperture and thus the threshold area 131 extends laterally across the hallway so that users must pass through the threshold area to transit the access point.

In a preferred embodiment, the positioning unit 110 accounts for signals that are reflected off of surfaces and objects (e.g., walls, furniture, people) as well as signals from devices on different floors and/or behind the door 129, which leads to the restricted area. The positioning unit 110 must account for signals coming from other areas of the building 102 because the signals in the 2.4 GHz band are able to travel through walls and floors. Moreover, the positioning unit 110 must also ensure that the door striker 133 is not accidentally unlocked due to an authorized user 104 walking on a different floor.

Figure 3C:
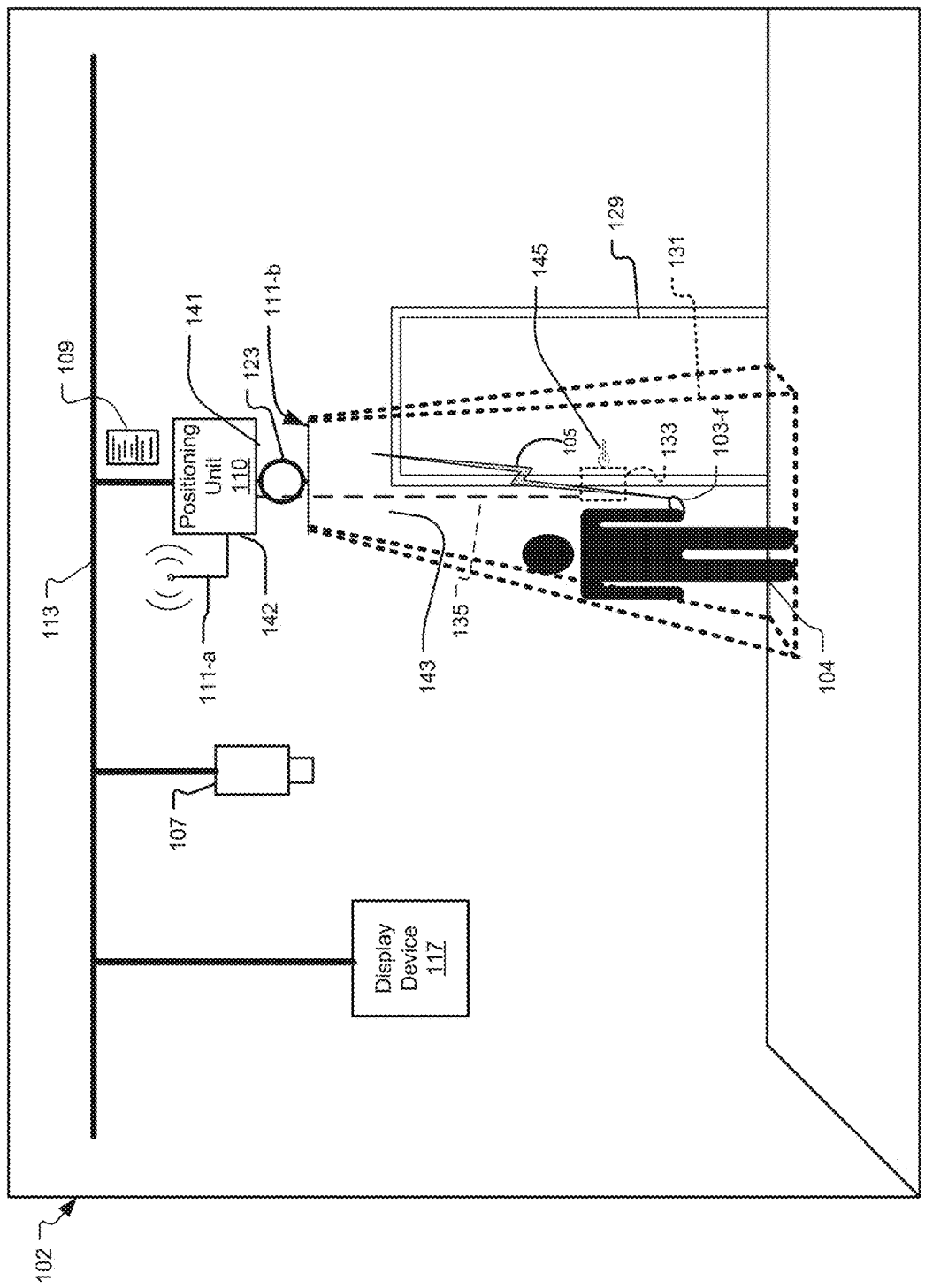
FIG. 3C is a schematic diagram illustrating an embodiment of the positioning unit with a directional antenna such as a flat patch-array panel or horn antenna.

FIG. 3C is a schematic diagram illustrating another embodiment of the positioning unit 110. Instead of using an omnidirectional antenna within an enclosure to form the directional antenna 111-*b*, however, native directional antenna technology is used.

In one example, the directional antenna 111-*b* is a horn antenna. Generally, horn antennas include a waveguide to collect radio waves from a given direction, characterized by horizontal and vertical beam widths, for reception and detection.

In another example, the directional antenna 111-*b* is a flat panel antenna, fixed phased-array antenna, or a phase-array or patch-array antenna. These are directional antennas that can be flush mounted in the wall or ceiling.

FIG. 4A-4I) are sequence diagrams for interactions between major components for four different implementations of the system 100.

FIG. 4A shows component interactions for a first exemplary implementation implementation system 100. In this implementation, the verification and tracking system 115 sends a door signal to the door controller 112 to unlock the door access point 129 in response to the verification and tracking system 115 authorizing the user 104 after the user has entered the threshold area 131.

First, in step 402, user accounts 19 including user information 88 and authorization information 46 are sent from the system controller 118 to the verification and tracking system 115 via the network 113. This updates a local "cache" of user accounts 19 including user information 88 and authorization information 46 within the verification database 114 of the verification and tracking system 115. The system controller 118 periodically updates the cache of user accounts 19 on the verification and tracking system 115 at regular intervals (e.g., daily, weekly). Locally storing the user accounts 19 to the verification and tracking system 115 enables faster operation and allows the system 100 to continue to function if communications are lost with the system controller 118.

In step 404 and generally on a continuous/periodic basis, the user device 103 broadcasts wireless signals including user information 88, and the positioning unit 110 detects the wireless signals and extracts the user information 88. Additionally, the positioning unit 110 calculates the location of the user device 103, and determines if the user device (and therefore if the user) is in the threshold area 131, in step 405. The user information 88 and the location data 109 are then sent to the verification and tracking system 115 for authentication in step 406. In examples, the user device 103 can have integrated BLE capability, or include an external BLE-enabled device such as a BLE dongle that plugs into a USB port of a smartphone user device 103-*s*, in examples.

According to step 408, the verification and tracking system 115 can request an update to its local cache of user accounts 19 when stale. The information 88/46 within the user accounts 19 is stale if its time stamp indicates that it is older than a predetermined threshold value (e.g. one hour) as compared to the current time, in one example.

In step 410, the verification and tracking system 115 then determines if the user 104 is as authorized user for the access point 129. For this purpose, the verification and tracking system 115 first compares the user information 88 forwarded from the positioning unit 110 to the stored user information 88 within its local cache of user accounts 19. If required, the verification and tracking system 115 may confirm user status and account information with the system controller 118 if the users' information 88 have not been previously sent to the verification and tracking system 115. Upon finding a match, the verification and tracking system 115 then executes a lookup of the matched user information 88 against the locally stored authorization information 46 in the cache for the user. If the authorization information 46 indicates that the user is allowed access to the access point 129 near the positioning unit 110, the verification and tracking system 115 identifies the user 104 as an authorized user for the access point. In one implementation, this occurs when the matched user information 88 is referenced within the authorization information 46.

In step 412, if the user is an authorized user, and the user's user device 103 was also determined to be within a threshold area 131, then the verification and tracking system 115 sends a door control signal to the door controller 112 to enable access to the access point of the restricted area (e.g., unlock the door 129 access point). In the event that there are multiple authorized users also within close proximity of the door 129, then the door controller 112 keeps the door 129 unlocked until all users have entered the restricted area.

Additionally, while not illustrated in the figure, the verification and tracking system 115 may also send "Access granted" messages to be displayed on display devices 117 to provide visual indications to the users, in some examples.

In should be noted in some embodiments, several positioning units 110 will communicate with the same verification and tracking system. In other cases, however, the verification and tracking system is integrated together with the positioning unit, in the same box, possibly.

FIG. 4B shows major component interactions for a second exemplary implementation of the system 100. In this implementation, the positioning unit 110 sends a door signal to the door controller 112 to unlock the door access point 129 in response to the verification and tracking system 115 authorizing the user 104 after the user has entered the threshold area. Steps 422, 424, 425, 426, 428, and 430 operate in a similar fashion as in steps 402, 404, 405, 406, 408, and 410, respectively, of FIG. 4A.

In step 432, if the user is an authorized user, and the user device 103 carried by user was also determined to be within a threshold area 131 of the restricted area, then the verification and tracking system 115 sends a door control signal to the positioning unit 110. The positioning unit 110 then forwards the door control signal to the door controller 112 in step 434 to enable access to the access point 129 of the restricted area.

FIG. 4C shows component interactions for a third exemplary implementation of the system 100. Unlike the implementations of FIG. 4A and FIG. 4B, the verification and tracking system 115 pre-authorizes the users as the users carrying the user devices 103 are approaching the threshold area 131. When the pre-authorized users then come within the threshold area 131, the verification and tracking system 115 sends a door signal to the door controller 112 to unlock the door access point 129.

One problem that can arise when authorizing users 104 relates to the response time of the system. Generally, the door controller 112 should grant or deny access within 250 milliseconds to authorized users 104. The process of detecting the user device 103 combined with determining whether the user is authorized, or not, consumes response time. In some circumstances, this response time could possibly exceed theta et response time of 250 milliseconds.

To address this issue, a pre-authorization process is used in some implementations. First, in step 462, user accounts 19 including user information 88 and authorization information 46 of the users are sent from the system controller 118 to the verification and tracking system 115 via the network 113. The positioning unit 110 then receives user information 88 sent from mobile computing device users and fob users in step 464. This information 88 is obtained for all users 104 carrying user devices 103 that are within the signal range of the positioning unit 110. In one example, this information 88 is obtained for all users 104 carrying user devices 103 that are approaching the threshold area 131 (e.g. within the signal range of the omnidirectional antenna 137 of the positioning unit 110.

With some technologies, this process will include all users within possibly 80 feet (25 meters). In other examples, the signal strength of the signals received from the user devices 103 is used to limit the pre-authorization to only a limited number of users such as users that are approaching the door or other access region, e.g., users that are within 30 feet or 10 meter range and/or have devices that have a received signal strength of greater than a threshold power level as detected by the positioning unit 110.

The user information 88 for these near or approaching users is then forwarded by the positioning unit 110 over the network 113 to the verification and tracking system 115 for authentication in step 466. According to step 468, the verification and tracking system 115 can request an update to its local cache of user accounts 19 when stale. The information is stale if its time stamp indicates that it is older than a predetermined threshold value (e.g. one hour) as compared to the current time.

In step 470, the verification and tracking system 115 determines if the users are authorized users, or not. For this purpose, the verification and tracking system 115 first compares the user information 88 forwarded from the positioning unit 110 to its locally stored user account 19 cache including user information 88 for the users 104. If required, the verification and tracking system 115 may confirm user status and account information with the system controller 118 if the users' information 88 have not been previously sent to the verification and tracking system 115. In one example, when the user devices are smart phone user devices 103-s, the verification and tracking system 115 authorizes user devices 103 of the users 104 by comparing a token-based user ID 98 of its locally stored user information 88 against a token-based user ID 98 extracted from user information 88 that the positioning unit 110 received from the user devices 103-s and then forwarded over the data network 113 to the verification and tracking system 115.

Upon finding a match, the verification and tracking system 115 then executes a lookup of the matched user information 88 against its local copy of the authotization information 46. If the local copy of the authorization information 46 indicates that the user is allowed access to the access point near the positioning unit 110, the verification and tracking system 115 identifies the user 104 as an authorized user for the access point. In one implementation, this occurs when the matched user information 88 is referenced within the local copy of the authorization information 46.

Additionally, the positioning unit 110 calculates the location of the user devices 103, and determines if the user devices 103 (and therefore if the user is in the threshold area 131, in step 472. For users that are determined to be at the door 129 or access region threshold 131, the user information 88 for these users within the threshold 131 are sent to the verification and tracking system 115 in step 474. Due to the pre-authorization process, in most cases, the verification and tracking system 115 will already know the users' status and thus signals the door controller 112 to grant access or not in step 476 with a very low latency.

FIG. 4D shows component interactions for a fourth exemplary implementation of the system 100. In this implementation, the positioning unit 110 can additionally function as an access controller to pre-authorize the users as the users 104 carrying the user devices 103 are approaching the threshold area 131. When the pre-authorized users then come within the threshold area 131, the positioning unit 110 sends a door signal to the door controller 112 to unlock the door.

As with the verification and tracking system 115 of FIG. 4C, the positioning unit 110 of FIG. 4D additionally maintains a local copy or "cache" of user accounts 19 including user information 88 and authorization information 46. The positioning unit 110 receives updates to its local cache of user accounts 19 via the verification and tracking system 115. To manage the temporal relevance of its local user information 88/authorization information 46, the positioning unit 110 maintains a current time, and applies a time stamp to each item of user information 88/authorization information 46 in the user accounts 19 received from the verification and tracking system 115.

First, in step 482, the system controller 118 sends user accounts 19 including user information 88 and authorization information 46 of the users to the verification and tracking system 115. In step 484, the verification and tracking system 115 then forwards the received user accounts 19 to the positioning unit 110 via the network 113. The positioning unit 110 then receives user information 88 sent from mobile computing device users and fob users in step 486. This information 88 is obtained for all users 104 carrying user devices 103 that are approaching the threshold area 131 (e.g. within the signal range of the omnidirectional antenna 137 of the positioning unit 110).

According to step 488, the positioning unit 110 can request an update to its local cache of user accounts 19 including user information 88 and authorization information 46 when stale. The information 88/46 is stale if its time stamp indicates that it is older than a predetermined threshold value (e.g. one hour) as compared to the current time.

In step 490, the positioning unit 110 pre-authorizes the users by determining if each user is an authorized user. For this purpose, the positioning unit 110 compares the user information 88 sent from the user devices 104 to its locally stored user information 88 for the users 104 within the cache of user accounts 19. If required, the positioning unit 110 may confirm user status and account information with the system controller 118 if the users' information 88 have not been previously sent to the positioning unit 110. In one example, when the user devices are smart phone user devices 103-s, the positioning unit 110 authorizes user devices 103 of the users 104 by comparing a token-based user ID 98 of its locally stored user information 88 against a token-based user ID 98 that the positioning unit 110 extracts from the user information 88 that the positioning unit 110 receives in the packet data 105 transmitted from the user devices 103-s.

Upon finding a match, the positioning unit 110 then executes a lookup of the matched user information 88 against its local copy of the authorization information 46 in its cache of user accounts 19. If the local copy of the authorization information 46 indicates that the user is allowed access to the access point near the positioning unit 110, the positioning unit 110 identifies the user 104 as an authorized user for the access point. In one implementation, this occurs when the matched user information 88 is referenced within the local copy of the authorization information 46.

Additionally, the positioning unit 110 calculates the location of the user devices 103, and determines if the user device 103 (and therefore if the user in the threshold area 131, in step 492. For users that are determined to be at the door access point 129 or threshold area 131, the positioning unit 110 compares the received user information 88 for these users within the threshold 131, in step 494, to its local copy of user information 88. Due to the pre-authorization process, in most cases, the positioning unit 110 will already know the users' status and thus signals the door controller 112 to grant access or not in step 496 with a very low latency.

FIG. 5A is a flowchart illustrating how the positioning unit 110 determines the location of a user based on the signal characteristics of the mobile broadcasting user device 103.

In a typical implementation, the positioning unit 110 determines if the origin of the signal (e.g., the fob 103-f currently broadcasting its user information) is directly beneath the positioning unit 110 and enclosure 127 and in the volumetric region above the threshold area 131 defined by the aperture of the directional antenna 111-b. This is accomplished by comparing the signal strength of the two antennas (i.e., the omnidirectional antenna and the directional antenna). By comparing the strength of the received wireless signals between the two antennas 111-a, 111-b, the positioning unit 110 determines if the user devices 103 and thus the users 104 are in close proximity to the door 129 (i.e., in the threshold area 131).

For example, wireless signals sent from a user device within the threshold area 131 will likely be detected by both the primary (i.e. omnidirectional 111-a) and directional antenna 111-b and will be among the highest in signal strength. Because each of the antennas have received a wireless signal from the same device with a high signal strength as compared to threshold/expected values, the positioning unit can infer that the user device 103 is likely located within the threshold area 131. In addition, wireless signals that are relatively the same in strength as determined by the antennas 11-b but each have a very low or weak value for their signal strength likely means that the user device 103 is also within the threshold area 131. In one example, this could occur when the user device 103 is not within clear line of sight with the positioning unit 110, such as when placed in a rear pocket of pants worn by the user 104 or when placed in a backpack worn by the user 104, in examples, due to the resultant radio frequency shielding. Finally, signals sent from a user device located perhaps 3 or 15 meters or more away from the positioning unit 110 will either be very weak or undetected by the directional antenna ill-b, but will likely be detected by the omnidirectional antenna 111-b. This is because the signals are well within the signal range of the omnidirectional antenna 111-b. Because the directional antenna 111-b receives a weak signal or no signal and the omnidirectional antenna 111-a receives a signal with a nominal strength after comparing its signal strength to threshold/expected values, the positioning unit can infer that the user device 103 is likely located away from the threshold area 131.

In step 550, the user device 103 broadcasts user information 88. Next, the primary antenna (functioning as an omnidirectional antenna 111-a) of the positioning unit 110 receives user information 88 from the user device 103 in step 552. The directional antenna 111-b of the positioning unit 110 also receives user information from the user device 103 in step 554.

The positioning unit 1110 sends the user information 88 and location data 109 to the verification and tracking system 115 in step 556. In step 558, the positioning unit 110 receives an indication of whether the user 104 is authorized to enter the restricted area from the verification and tracking system 115.

In step 560, the positioning unit 110 compares the signal strength between the omnidirectional 111-a antenna and the directional antenna 111-b. Next, the positioning unit 110 determines the relative strength of the signals between the antennas in step 562.

In step 564, the positioning unit 110 determines if the signal strength is greater than or equal to a predetermined signal strength threshold value. The relative strength of the signals between the antennas is indicative of the user being in the threshold and whether the user 104 was authorized by the verification and tracking system 115. In general, as the fob 103 moves toward the threshold area 131 in front of door access point 129, the signal strength approaches its maximum value and the difference in signal strength received by the two antennas 111-a, 111-b diminishes. Once the signal strength meets or exceeds the predetermined signal strength threshold value and/or the signal strength difference between antennas 111-a, 111-b has decreased below a difference threshold, then the user device 103 (and therefore the user 104) are determined to be within the threshold area 131 in front of the door 129.

If step 564 resolves to true, then the positioning unit 110 sends a signal to the door controller 112 to unlock the door access point 129 for the authorized user 104 in step 566. In some examples, the positioning unit waits to unlock the door until the authorized user 104 has remained stationary in the threshold area for a wait time of greater that a second or two seconds or more. This ensures that the door is not unlocked simply because an authorized user walked in front of or simply passed-by the door.

Otherwise, the positioning unit 110 generates an alert if the non-authorized user 104 lingers in front of the door 129 for longer than a predefined lingering threshold value, according to step 568. A typical lingering threshold value is 5 seconds. Sometimes this lingering threshold value is greater and in some cases a lower lingering threshold value is used.

FIG. 5B shows both a graph 602 of Received Signal Strength Indication (RSSI) values as a function of distance, for iBeacon and BLE112 hardware implementations of BLE, and a table 604 of exemplary RSSI vs. distance values from the graph 602. The RSSI values are in units of Decibel-milliwatts (or dbm), where the distance of the user devices 103 to the positioning unit 110 is measured in feet.

The graph 602 plots the RSSI values for both BLE112 and iBeacon-equipped iPhone user devices 103 communicating with a positioning unit 110 according to principles of the present invention. iPhone and iBeacon are registered trademarks of Apple, Inc. The graph 602 has a maximum measured distance of 27 meters. According to the iBeacon specification, wireless signals sent via iBeacon are calibrated to −59 dbm at 1 meter. Other reference parameters include a BLE specified design range of 50 meters, a BLE112 sensitivity of (−92) dbm, and an iPhone sensitivity of (−105) dbm.

The graph 602 also includes three zones 606. The first zone is the immediate zone 606-1. The immediate zone 606-1 typically encompasses the threshold area 131 and has a range of 0 to 3 feet from the door access point 129 (or approximately 0 to 1 meter). Generally, very accurate position information is obtained in the immediate zone 606-1. The second zone is the near zone 606-2. The range of the near zone 606-2 is approximately 7 to 10 feet (or 1 to 3 meters). Typically, accurate position information can also be obtained in the near zone 606-2. Finally, the third zone is the far zone 606-3, which extends from approximately 10 feet to 80 feet (approximately 3 to 24 meters). In the far zone 606-3, the positioning unit 110 is able to identify the presence of user devices 103 (or users), but the positioning information is less reliable in this zone.

FIG. 6 is a flow chart that describes how a positioning unit 110 determines low power conditions (e.g. low battery) of an exemplary user device 103 such as fobs 103-*f* and smart phones 103-*s* from the wireless signals sent by the user device 103.

In step 502, a user device 103 broadcasts user information 88. According to step 504, the Positioning Unit 110 receives the user information 88 from the user device. Then, in step 505, the Positioning Unit establishes a baseline operating signal of the user device 103 whenever the user device passes within the range of the directional antenna 111-*b*.

According to step 506, the Positioning Unit 110 sends the user information 88 to the Verification and Tracking System 115. The Verification and Tracking System 115 then identifies the user in step 508. In step 510, the Antenna controller 206 of the Positioning Unit 110 determines the signal strength and range of the user device 103 from the Positioning Unit 110. The Processor 204 of the Positioning Unit 110, in step 512, compares the user device signal strength information to a predefined range of "low power" threshold values that the Positioning Unit 110 maintains for the user devices 103. In one implementation, with reference to FIG. 5B, the Positioning Unit 110 maintains a separate "low power" threshold value for each of the zones 606-1 through 606-3 in the RSSI versus distance graph 602 of FIG. 5B.

In step 514, the positioning unit 110 determines whether the strength of user device signal strength is below a range of "low power" threshold values. If the user device signal strength is not below the range of threshold values, the method transitions back to step 505. Otherwise, the method transitions to step 516.

According to step 516, the positioning unit 110 generates an alert for user to warn the user devices 103 about the low power condition of the user device 103. The Verification and Tracking System 115 also sends an electronic mail/SMS message to the user concerning the low power condition, in step 518.

FIG. 7 is a schematic diagram that illustrates how the positioning unit 110 as described in the sequence diagram of FIG. 4D can receive updates to its local copies of user accounts 19 from the verification and tracking system 115, and can pre-authorize users 104 as the users carrying user devices 103 approach a threshold area 131 of a door access point 129 located near the positioning unit 110. The local copies of user accounts 19 maintained by components other than the system controller 118 are also referred to as a cache of user accounts 19.

The verification and tracking system 115 has a local copy or cache of user accounts 19*a* in its verification database 114. The system controller 118 sends its user accounts 19-1 . . . 19-N, which the verification and tracking system 115 stores as 19*a*-1 . . . 19*a*-N.

In a similar vein, the verification and tracking system 115 can send its cache of user accounts 19*a*-1 . . . 19*a*-N to the positioning unit 110 and also provide periodic updates. These are stored as a local cache of user accounts 19*b*-1 . . . 19*b*-N within the positioning unit 110. In addition, the positioning unit 110 can explicitly request that the verification and tracking system 115 update the contents of the cache 19*b*, such as when the positioning unit 110 determines that the contents of the cache 19*b* have become stale.

In one implementation, when users 104 carrying user devices 103 approach a threshold area 131 of a door access point 129 near the positioning unit 110, its omnidirectional antenna 111-*a* detects wireless signals including packet data 105 sent from user devices 103-*s* carried by users 104. The packet data 105 includes user information 88*b* of the user 104. To pre-authorize the user 104, in accordance with FIG. 4D, the positioning unit 110 compares the user information 88*b* with the stored user information 88 for the user within the cache 19*b*. Upon finding a match, the positioning unit 110 then executes a lookup of the matched user information 88 against its authorization information 46. If the authorization information 46 indicates that the matched user information 88 for the user is allowed access to the access point 129-1 near the positioning unit 110, the positioning unit 110 identifies the user 104 as an authorized user for the access point.

The following describes a search algorithm of the positioning unit 110 for verifying token-based userIDs included within the packet data 105 of the wireless signals transmitted by the user devices 103. The packet data 105 sent within the wireless signals are also referred to as messages.

Firstly, the first message received from the user device 103 after an absence of messages for three minutes will establish a base time for the token user ID 98. After this initial message, messages received during the cycle must have times consistent with the elapsed time between messages. Messages outside of expected range will be ignored. The range will be +/−2 seconds after the first message.

Secondly, unidentified messages (e.g. messages that have not been received since user device initialization) or locally stored user information 88 within the cache of user accounts 19b that have not been accessed from more than three minutes, will be identified by the positioning unit 110 requesting an update to its cache 19b from the verification and tracking system 115 and generating a verification hash for each item of user information 88 (e.g. phone number) within a +/− two hour time range until the hash matches the received hash.

Thirdly, when completing a match verification for an identified or old wireless message, user information 88 extracted from the will be sorted by the time duration since the last received message with the most recent duration being at the front of the sort (e.g. in descending order).

While this invention has been particularly shown and described with references to preferred embodiments thereof, it will be understood by those skilled in the art that various changes in form and details may be made therein without departing from the scope of the invention encompassed by the appended claims.

What is claimed is:

1. An access control system for monitoring an access point, comprising:
a positioning unit for tracking locations of users relative to the access point using wireless signals generated by user devices carried by the users, wherein the positioning unit includes:
a primary antenna that receives the wireless signals from the user devices of the users;
a directional antenna that preferentially receives the wireless signals from the user devices from a threshold area of the access point; and
a processor for analyzing the wireless signals received by the primary antenna and the directional antenna for tracking the locations.

2. The system of claim 1, wherein the user devices include fobs and smart phones.

3. The system of claim 1, wherein the primary antenna is an omnidirectional antenna.

4. The system of claim 1, wherein the positioning unit identifies a low power condition of the user devices by determining a signal strength of the wireless signals sent from the user devices and comparing the determined signal strength to a range of signal strength threshold values.

5. The system of claim 1, wherein the positioning unit tracks the locations of the user devices relative to the access point by comparing relative signal strengths of the received wireless signals between the primary antenna and the directional antenna.

6. The system of claim 1, wherein the positioning unit tracks the locations of the user devices relative to the access points by triangulating based on the times when the wireless signals were received at the positioning unit.

7. The system of claim 1, wherein the wireless signals from the user devices of the users include user information for identifying the users.

8. The system of claim 1, further comprising:
a verification and tracking system that pre-authorizes the users when the positioning unit detects that the user devices of the users are approaching the threshold area of the access point; and
a door controller that receives a door control signal to enable entry to the access point, in response to the positioning unit detecting a user device of a pre-authorized user within the threshold area of the access point.

9. The system of claim 8, wherein the verification and tracking system pre-authorizes the users by:
receiving user information that identifies the users sent from the positioning unit, which the positioning unit extracted from wireless signals sent by the user devices of the users;
matching the received user information to a stored set of user information for the users; and
determining that the matched user information is referenced within a stored set of authorization information for the users that indicates which users can enter the access point.

10. The system of claim 1, wherein the positioning unit pre-authorizes the users upon detecting that the user devices of the users are approaching the threshold area of the access point, and sends a door control signal to a door controller of the system to enable entry to the access point in response to the positioning unit detecting a user device of a pre-authorized user within the threshold area of the access point.

11. The system of claim 10, wherein the positioning unit pre-authorizes the users by:
extracting user information that identifies the users from the wireless signals sent by the user devices;
matching the extracted user information to a stored set of user information for the users; and
determining that the matched user information is referenced within a stored set of authorization information for the users that indicates which users can enter the access point.

12. The system of claim 1, further comprising:
a system controller that stores user information of the users, stores authorization information that identifies which users can enter the access point, and sends the user information and authorization information over a network; and
a verification and tracking system that stores local versions of user information and authorization information from the user information and authorization information sent over the network from the system controller, and authorizes the users to enter the access point based on its local versions of user information and authorization information.

13. The system of claim 1, further comprising:
a system controller that stores user information of the users, stores authorization information that identifies which users can enter the access point, and sends the user information and authorization information over a network; wherein the positioning unit stores local versions of user information and authorization information in a local cache of user information and authorization information, and wherein the positioning unit authorizes the users to enter the access point based on its local cache of user information and authorization information.

14. A method for controlling access of users to an access point, comprising:
- tracking locations of users relative to the access point using wireless signals generated by user devices carried by the users via a positioning unit associated with the access point, the positioning unit tracking the locations by comparing the wireless signals received from a primary antenna and a directional antenna; and
- the positioning unit receiving user information for identifying the users to provide the access for the users.

15. The method of claim 14, wherein tracking locations of the users relative to the access point comprises comparing a received signal strength of the wireless signals received between the primary antenna and the directional antenna of the positioning unit.

16. The method of claim 14, wherein tracking locations of the users relative to the access point comprises triangulating using received times of the wireless signals.

17. The method of claim 14, further comprising the positioning unit identifying a low power condition of the user devices by determining a signal strength of the wireless signals sent from the user devices and comparing the determined signal strength to a range of signal strength threshold values.

18. The method of claim 14, further comprising authorizing the users by:
- matching the user information received by the positioning unit to a stored set of user information for the users; and
- determining that the matched user information is referenced within a stored set of authorization information for the users that indicates which users can enter the access point.

19. The method of claim 14, further comprising authorizing the users to enter the access point when the user devices of the users are determined to be within the threshold area of the access point.

20. The method of claim 14, further comprising authorizing the users to enter the access point when the user devices of the users are approaching the threshold area of the access point.

* * * * *